United States Patent
Pathre

(10) Patent No.: US 11,886,174 B2
(45) Date of Patent: Jan. 30, 2024

(54) VIRTUALIZED CABLE MODELING FOR MANUFACTURING RESOURCE SIMULATION

(71) Applicant: Dassault Systemes Americas Corp., Waltham, MA (US)

(72) Inventor: Uday Pathre, Troy, MI (US)

(73) Assignee: Dassault Systemes Americas Corp., Waltham, MA (US)

( * ) Notice: Subject to any disclaimer, the term of this patent is extended or adjusted under 35 U.S.C. 154(b) by 831 days.

(21) Appl. No.: 16/944,859

(22) Filed: Jul. 31, 2020

(65) Prior Publication Data
US 2022/0035352 A1    Feb. 3, 2022

(51) Int. Cl.
*G05B 19/418*    (2006.01)
*G06F 30/23*    (2020.01)
*G06F 30/10*    (2020.01)

(52) U.S. Cl.
CPC ... *G05B 19/41885* (2013.01); *G05B 19/4188* (2013.01); *G05B 19/41815* (2013.01); *G06F 30/10* (2020.01); *G06F 30/23* (2020.01)

(58) Field of Classification Search
CPC ................................ G06F 30/23; G06F 30/10
USPC ......................................................... 700/29
See application file for complete search history.

(56) References Cited

U.S. PATENT DOCUMENTS

| 6,480,190 | B1 * | 11/2002 | Pfister | G06T 17/20 |
| | | | | 345/419 |
| 2006/0265202 | A1 * | 11/2006 | Muller-Fischer | G06T 17/00 |
| | | | | 703/6 |
| 2014/0200863 | A1 * | 7/2014 | Kamat | E02F 9/245 |
| | | | | 703/1 |
| 2017/0124230 | A1 * | 5/2017 | Liu | G06F 17/16 |
| 2019/0108300 | A1 * | 4/2019 | Soler Arasanz | G06F 30/00 |

FOREIGN PATENT DOCUMENTS

| CN | 104240290 B | 2/2017 |
| JP | H07182017 A | 7/1995 |
| WO | 2017018113 A1 | 2/2017 |
| WO | 2021149419 A1 | 7/2021 |

OTHER PUBLICATIONS

European Search Report for EP 21 18 8155, titled "Virtualized Cable Modeling For Manufacturing Resource Simulation", dated Jan. 4, 2022.

* cited by examiner

*Primary Examiner* — Md Azad
(74) *Attorney, Agent, or Firm* — Hamilton, Brook, Smith & Reynolds, P.C.

(57) ABSTRACT

Embodiments simulate a manufacturing resource including a cable by creating a polyline model of the cable that includes a collection of points. For each point, there is an associated point mass and zero mass sphere, and an assigned elasticity and torsional stiffness between the point and adjacent points. Position and orientation of a start point and an end point of the points is defined based upon position in three dimensional (3D) space of a manufacturing resource. In turn, a simulation of the cable for a time step is performed by computing forces on each point using: (i) the associated point mass, (ii) the associated zero mass sphere, (iii) the assigned elasticity and torsional stiffness between the point and adjacent points, and (iv) the defined position and orientation of the start point and end point. Performing the simulation determines position in 3D space of each point based on the computed forces.

21 Claims, 21 Drawing Sheets

VIRTUALIZED CABLE MODELING FOR MANUFACTURING RESOURCE SIMULATION

FIELD OF INVENTION

Embodiments of the invention generally relate to the field of computer programs and systems, and specifically, to the fields of computer aided design (CAD); computer aided engineering (CAE); three-dimensional (3D) computer graphic modeling and simulation; and modeling, simulation, analysis, usage planning, programming, and optimization of manufacturing processes and resources, such as industrial robots.

BACKGROUND

A number of systems and programs are offered on the market for the design and simulation of parts, assemblies of parts, and systems. These systems and programs, e.g., CAD programs, allow a user to construct and manipulate complex three-dimensional models of objects, assemblies of objects, and systems. CAD programs provide a representation of modeled objects and systems using edges or lines, in certain cases with faces. Lines, edges, faces, or polygons may be represented in various manners, e.g., non-uniform rational basis-splines (NURBS).

CAD systems manage parts or assemblies of parts of modeled objects, which are mainly specifications of geometry. In particular, CAD files contain specifications, from which geometry is generated. From geometry, a representation is generated. Specifications, geometries, and representations may be stored in a single CAD file or multiple CAD files. CAD systems include graphic tools for representing the modeled objects to the designers; these tools are dedicated to the display of complex objects. For example, an assembly may contain thousands of parts.

The advent of CAD and CAE systems allows for a wide range of representation possibilities for objects, such as CAD models, and finite element models (FEMs), amongst other examples. FEMs, or other such CAD or CAE models (generally referred to as computer-based models) may be programmed in such a way that the computer-based model has the properties of the underlying object or objects that it represents. When a computer-based model is programmed in such a way, it may be used to perform simulations of the object that the model represents. For example, a FEM may be used to represent the interior cavity of a vehicle, the acoustic fluid surrounding a structure, and any number of real-world objects and systems. When a given model represents an object and is programmed accordingly, it may be used to simulate the real-world object itself and interactions between the real-world object and other objects. For example, a FEM representing a stent may be used to simulate the use of the stent in a real-life medical setting.

Moreover, computer-based models may be used to improve the design of objects and processes, e.g., methods for manufacturing, that the models represent. These improvements may be identified through use of simulation techniques, such as optimization techniques, that run a series of simulations using a computer-based model, e.g., FEM model, in order to identify changes to the design of an object or process represented by the computer-based model.

SUMMARY

Three-dimensional (3D) computer-based model, i.e., computer graphic, simulation methods and techniques can be applied to manufacturing workcells and processes to simulate manufacturing processes. Results from the simulations, e.g., determined procedures and programs, can be downloaded and applied to manufacturing resources on a factory floor to drive the manufacturing resources, e.g., industrial robots. As part of this process, a virtual 3D computer model (computer-based model) of the manufacturing workcell (which may include machines, fixtures, and work pieces, amongst other elements) are simulated to validate the process and identify any issues, such as reachability, collisions, and cycle time. Computer simulations also ensure proper operation of the offline programs, i.e., determined operations for a manufacturing resource, that will be downloaded to the manufacturing resources, such as industrial robots, in the factory. During such simulations, in addition to the kinematic motions of the robots and machines, there is a need to simulate flexible cables that are attached to these manufacturing resources. These cables can, for example, represent a flexible tubular hose containing a bundle of electric and pneumatic connections that carry power and control signals to an end effector, such as a spot weld gun, attached to a moving manufacturing resource. Simulation of such flexible cables in the context of kinematic motions of robots and machines is required to predict any issues that may arise due to wrapping or snagging of the flexible cables with the machines or workcell fixtures during the manufacturing process.

While methods exist for simulating these cables, the existing methods are inadequate and improved methods for simulating manufacturing resources that include cables are needed. Embodiments of the present invention provide improved methods and systems for modeling and simulating a manufacturing resource that includes a cable. Moreover, embodiments can also be used to control real-world objects, e.g., robots, in accordance with simulation results. In embodiments, the cable can be a single cable; a collection, i.e., bundle, of cables; a flexible cord, and generally any connection, e.g., connection line, on an object, such as a manufacturing resource.

One such example embodiment provides a computer-implemented method for simulating a manufacturing resource that has a cable. Such an embodiment creates a polyline model of the cable in computer memory. The created model includes a collection of points representing the cable. For each point of the collection of points, a point mass is associated with the point, a zero mass sphere is associated with the point, and an elasticity and torsional stiffness is assigned between the point and any adjacent point(s). To continue, position and orientation of a start point and an end point of the collection of points representing the cable is defined based upon position in three dimensional space of a manufacturing resource at an end of a time step. In this way, the relationship, i.e., points of attachment, between the cable and the manufacturing resource itself is set (defined). In turn, a simulation of the cable for the time step is performed. Performing the simulating includes computing forces on each point of the collection of points using: (i) the associated point mass, (ii) the associated zero mass sphere, (iii) the assigned elasticity and torsional stiffness between the point and adjacent point(s), and (iv) the defined position and orientation in three dimensional space of the start point and the end point of the collection of points. Performing the simulation also determines position in three dimensional space of each point (especially, each of the other points) of the collection of points representing the cable at the end of the time step based on the computed forces.

An embodiment receives user input indicating at least one of: cable length, cable end points, a number of points to represent the cable, cable density, stiffness of the cable, initial shape of the cable, and cable diameter. Such an embodiment may create the polyline model of the cable based upon the received user input. For instance, in an example implementation, the point mass associated with each point is based upon the received user input indicating cable density. In another example embodiment, the zero mass sphere associated with each point is based upon the received user input indicating cable diameter. For example, the diameter of the sphere may be set to be the diameter of the cable that was provided or otherwise specified by the user.

According to an embodiment, the computed forces include at least one of: gravitational force on each point, elastic force on each point, torsion equivalent force pairs on each point, and collision force between each zero mass sphere at each point and an obstacle, e.g., objects in the manufacturing resource and cable environment. An embodiment of the present invention determines the position in three dimensional space of each point of the collection of points at the end of the time step based on the computed forces. According to an embodiment, the positions are determined based on the computed forces by integrating accelerations and velocities due to a combination of the computed forces on each point to determine the position in three dimensional space of each point at the end of the time step.

Another example embodiment of the present invention determines the position (that is used to define the position and orientation of the start point and end point) in three dimensional space of the manufacturing resource at the end of the time step. According to an embodiment, the position in three dimensional space of the manufacturing resource at the end of the time step is determined by simulating the manufacturing resource using at least one of: a model of the manufacturing resource, kinematics of the manufacturing resource, motion planning for the manufacturing resource, and motion of one or more obstacles in an operating environment of the manufacturing resource. Another example embodiment associates an external gravitational acceleration with each point mass of the collection of points.

Yet another embodiment simulates the cable for a next time step. According to an embodiment, simulating the cable for the next time step includes updating the polyline model and performing the simulation of the cable for the next time using the updated polyline model. In an embodiment, such functionality includes computing the forces on each point of the collection of points for the next time step. In an embodiment, the forces for the next time step are computed using: (a) the associated point mass, (b) the associated zero mass sphere, (c) the assigned elasticity and torsional stiffness between the point and adjacent points, and (d) the updated polyline model. Moreover, performing the simulation of the cable for the next time step also includes determining position in three dimensional space of each point of the collection of points representing the cable at an end of the next time step based on the forces computed using the updated polyline model.

According to an embodiment, updating the polyline model includes updating position of each point based on the determined position in three dimensional space of each point of the collection of points at the end of the time step, i.e., the first time step. In this way, the polyline model of the manufacturing resource is updated to reflect the determined positions of the cable at the end of the previous time step. In another embodiment, updating the polyline model includes updating position and orientation of the start point and the end point of the collection of points representing the cable based upon position in three dimensional space of the manufacturing resource at the end of the next time step. Yet another embodiment determines the position in three dimensional space of the manufacturing resource at the end of the next time step. An example embodiment determines the position of the manufacturing resource at the end of the next time step by simulating the manufacturing resource using at least one of: the model of the manufacturing resource, kinematics of the manufacturing resource, motion planning for the manufacturing resource, and motions of one or more obstacles in an operating environment of the manufacturing resource. In this way, the position of the manufacturing resource at the end of the next time step is determined so as to reflect the state of the environment at the end of the next time step. Moreover, in an example implementation where the model of the manufacturing resource includes the environment and objects in the environment in which the manufacturing resource is operating, the model is updated with any changes to the environment, e.g., positions of obstacles.

Embodiments can be used to simulate entire manufacturing, e.g., workcell, environments. As such, in embodiments of the present invention, the model of the manufacturing resource can represent the manufacturing resource and the workcell environment in which the manufacturing resource with the cable operates. Such a model may include a manufacturing resource, i.e., robot, one or more cables associated with the manufacturing resource, an object being operated upon, obstacles in the environment, and any other objects in the workcell environment. In this way, embodiments can simulate real-world manufacturing conditions, including the manufacturing resource, the cable, and any conditions, e.g., potential obstacle objects, of the manufacturing environment.

Yet another embodiment is directed to a system that includes a processor and a memory with computer code instructions stored thereon. In such an embodiment, the processor and the memory, with the computer code instructions, are configured to cause the system to implement any embodiments or combination of embodiments described herein.

Another embodiment of the present invention is directed to a cloud computing implementation for simulating a manufacturing resource that includes a cable. Such an embodiment is directed to a computer program product executed by a server in communication across a network with one or more clients, where the computer program product comprises instructions which, when executed by one or more processors, causes the one or more processors to implement any embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
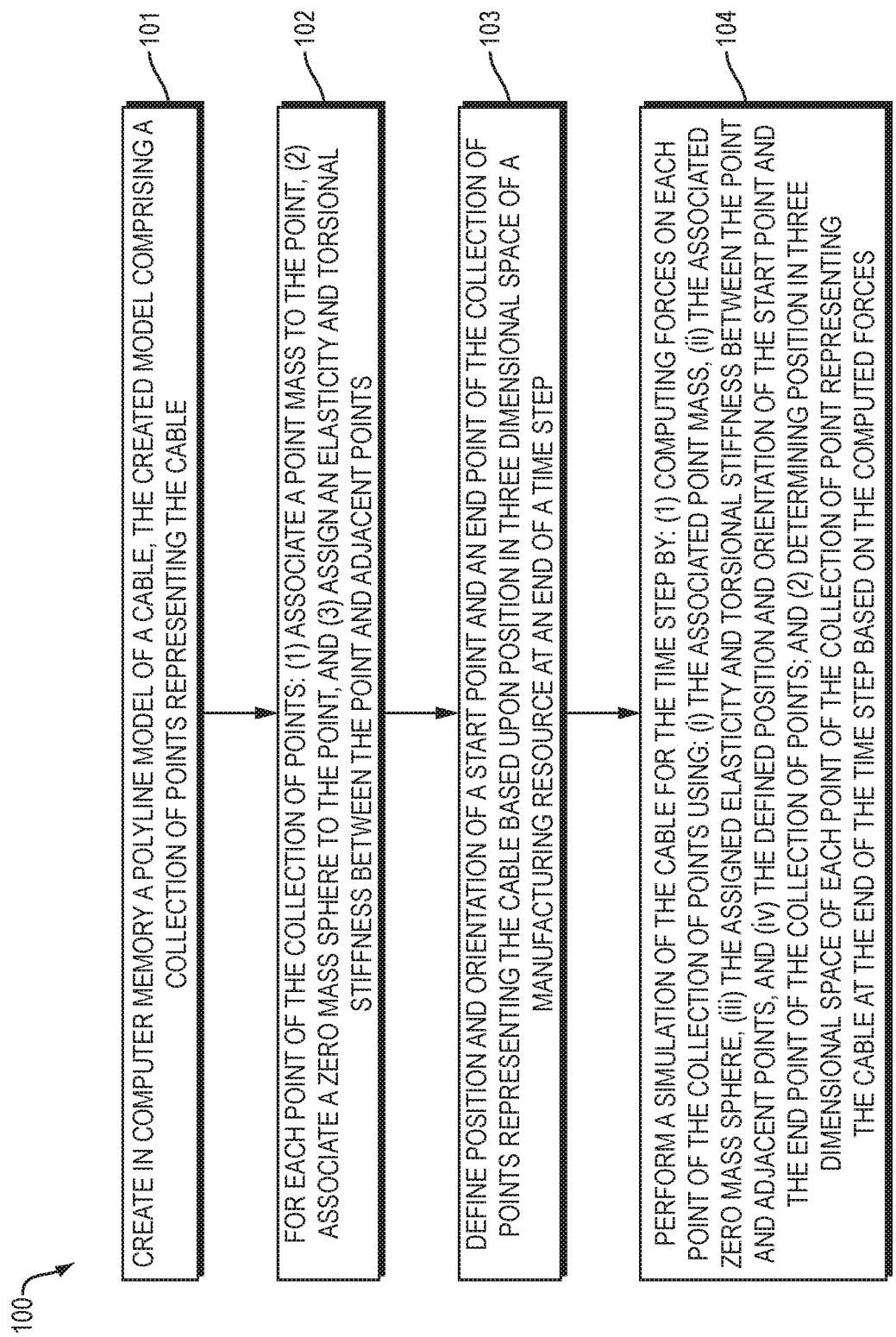
FIG. 1 is a flowchart of a method for simulating a manufacturing resource according to an embodiment.

A description of example embodiments follows.

The modeling and motion prediction of a manufacturing resource with a flexible cable during manufacturing resource simulation is quite challenging. During simulation, the motion behavior of the resource (e.g., robot or machine) can be predicted accurately based purely on kinematics related to the dimensions and alignments of the robot links and machine axes, combined with known motion trajectory algorithms and planning for the robot target positions and axis speeds.

However, for the cable attached to such a robot or machine, the prediction of the position and shape (i.e., location in 3D space) of the cable is not limited to kinematics. Instead, determining the position and shape of the cable requires modeling and simulation of the cable dynamics including the cable properties along with (1) the inertial and gravitational effects resulting from positions of the cable; (2) an initial cable shape; (3) history of motions, speeds and accelerations of the cable ends; and (4) cable constraint attachments based on the kinematic movements of the manufacturing resource that is driving the cable. In addition, the simulation of the cable needs to include the effect of dynamic contact between the cable and the environment in which the cable is being used, e.g., obstacles in the environment. For example, when the cable is resting on top of the robot arm or pressing against a workcell fixture.

The challenge for such a cable simulation is that traditional mathematical models of cable dynamics require extremely computationally intensive algorithms which make the simulation non-interactive and computationally expensive (in processor time, working memory, etc.). This prevents existing methods from being used in iterative simulations and optimizations. Moreover, the computationally intensive algorithms of existing methods prevent users from experimenting with operating conditions and procedures, i.e., performing interactive simulations. This is problematic because the user experience for simulating a manufacturing resource should allow for such interaction. Often, a simulation engineer simulating a manufacturing resource, e.g., robot, makes real time modifications to the robot targets and robot motion programs so as to fine tune the manufacturing process plan in the simulation software. Because existing methods for simulating manufacturing resources with cables rely on computationally intensive methods, such as modeling the cable as a single tube using a set of differential equations, the existing methods cannot facilitate such real time modifications. The traditional methods also have difficulty accurately depicting the constantly changing complex and unpredictable shape of the cable as the cable contacts obstacles in the environment during the continuous motion of the manufacturing resource.

Embodiments of the present invention solve these problems by providing a new approach to virtualize the flexible cable simulation for manufacturing resource applications or any other simulation that involves a cable. Embodiments model and simulate the flexible cable as a polyline of point masses with non-zero collision dimensions for obstacle contact and penetration avoidance. Such a polyline approach provides substantial computational performance improvements as well as obstacle contact based shape prediction compared to existing simulations of dynamic behavior of flexible cable bundles used with manufacturing resources. Embodiments make interactive simulation possible and allow users to make changes to operating conditions to fine tune and optimize the movements and actions of manufacturing resources. Further, embodiments allow iterative optimization methods to be used to automatically determine operating conditions and plans that achieve desired goals while meeting particular constraints and performance parameters.

Embodiments provide these improvements by implementing a novel polyline model to represent the cable. Existing polyline models are inadequate because existing polyline models do not include any consideration of cable stiffness based shape and do not include tension and obstacle collision behaviors, which are necessary to implement a useful predictive manufacturing simulation. Embodiments of the present invention implement an innovative approach which includes a new conceptual virtual shaping stiffness along with cable elasticity and non-zero collision dimensions of point masses along the polyline model. By implementing such a polyline model to represent the cable, embodiments are highly effective and efficient in simulating realistic behavior of the cable and for predicting cable shape for manufacturing applications, while also providing performance that allows for interactive simulation.

The new virtualized cable modeling approach implemented by embodiments of the present invention provides dramatic improvements over existing simulation methods. Specifically, embodiments provide a more computationally efficient approach for flexible cable behavior modeling and simulation in the context of kinematic motions of manufacturing resources such as robots and machines. Embodiments provide this functionality while determining realistic shapes of the cable and correct collision behavior and penetration avoidance behavior between the cable and objects in the workcell environment being simulated. As such, embodiments provide a manufacturing simulation that includes the kinematics of the manufacturing resource along with the dynamics of the cable, e.g., flexible cable bundle hose, and which determines highly realistic results while still allowing for an interactive user experience.

FIG. 1 is a flowchart of a method 100 for simulating a manufacturing resource including a cable. The method 100 starts by creating 101 a polyline model of a cable in computer memory. The polyline model created at step 101 is composed of a collection of points that represent the cable. According to an embodiment, creating the model at step 101 includes defining a collection of points in three-dimensional space as a model of the cable such that the length of the polyline corresponds to a specified length of the cable and the initial shape of the polyline is a simple parabola which terminates at specified end points. Further, in an embodiment, the polyline model may be created at step 101 according to principles known in the art. Then, as the method 100 continues, the polyline model created at step 101 is modified as described herein. In such an embodiment of the method 100, the model initially created at step 101 is a polyline model as is known in the art and, in turn, the model is modified so as to create a novel polyline model that implements embodiments of the present invention described herein.

Next, at step 102, for each point of the collection of points of the model created at step 101, a point mass is associated with the point, a zero mass sphere is associated with the point, and an elasticity and torsional stiffness is assigned between the point and any adjacent point or points. As such, the functionality of step 102 results in each point of the model created at step 101 having an associated point mass, an associated zero mass sphere and, a defined elasticity and torsional stiffness between the point and any adjacent point(s). An embodiment of the method 100 also associates an external gravitational acceleration with each point mass of the collection of points at step 102. Typically, in polyline models, the points making up the model are just that, points. As such, the points would have neither density nor stiffness. By associating a point mass and a zero mass sphere with each point and assigning an elasticity and torsional stiffness for each point at step 102, embodiments map density, stiffness, and dimensions of the real-world cable being simulated to an equivalent set of parameters of the points of the polyline model. By mapping the real-world properties of the cable to parameters of the points (point mass, zero mass sphere, elasticity, and torsional stiffness) the polyline model exhibits physics based behavior that is in line with the real-world cable.

According to an embodiment, at step 102, an indication of the point mass, zero mass sphere, and elasticity and torsional stiffness is stored in memory for each point. As such, "settings" (point mass, zero mass sphere, elasticity, and torsional stiffness) can be saved in memory for each point at step 102. In an embodiment, these properties (point mass, zero mass sphere diameter, elasticity, and torsional stiffness) may be metadata features associated with each point. In such an embodiment, at step 102, values for these metadata features are set. Another example embodiment of the method 100 also associates an external gravitational acceleration with each point mass of the collection of points at step 102. According to an embodiment, the diameter of the zero mass sphere corresponds, i.e., is equal to, the diameter of the cable being simulated.

Figure 5:
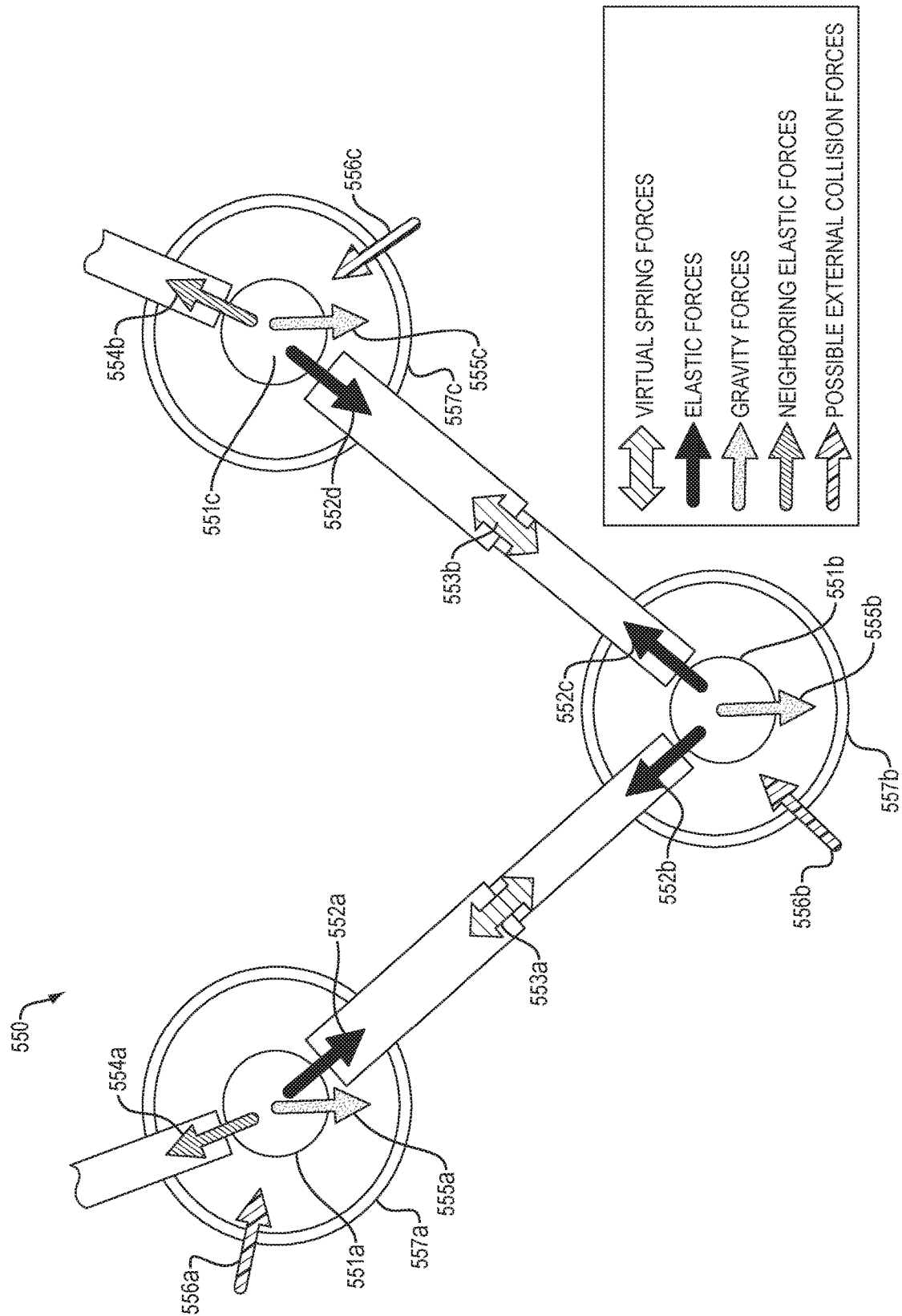
FIG. 5 is a conceptual illustration of elasticity forces in a cable model that may be implemented and simulated in embodiments.
Figure 6:
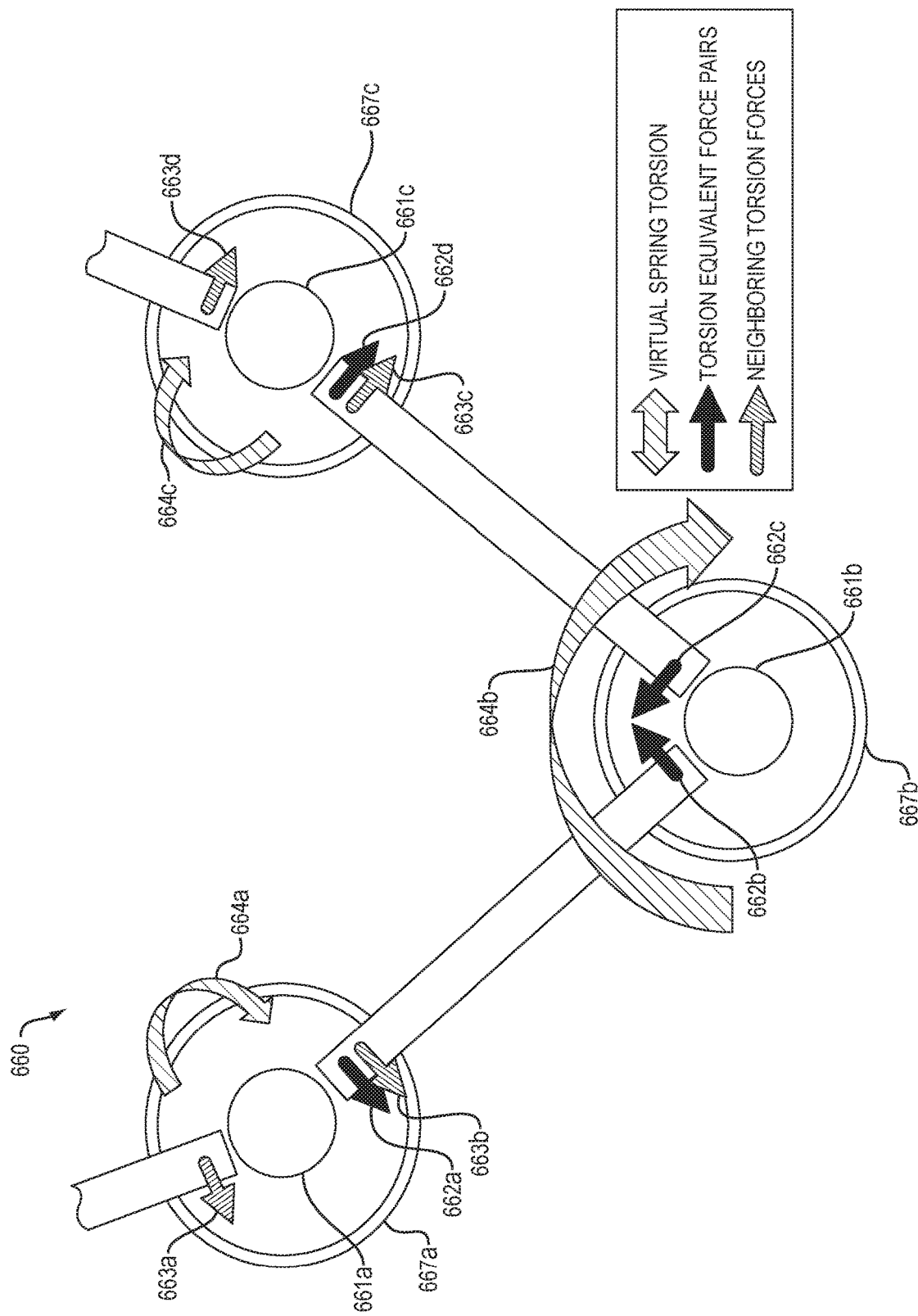
FIG. 6 is a conceptual illustration of stiffness forces in a cable model that may be implemented and simulated in embodiments.
Figure 7:
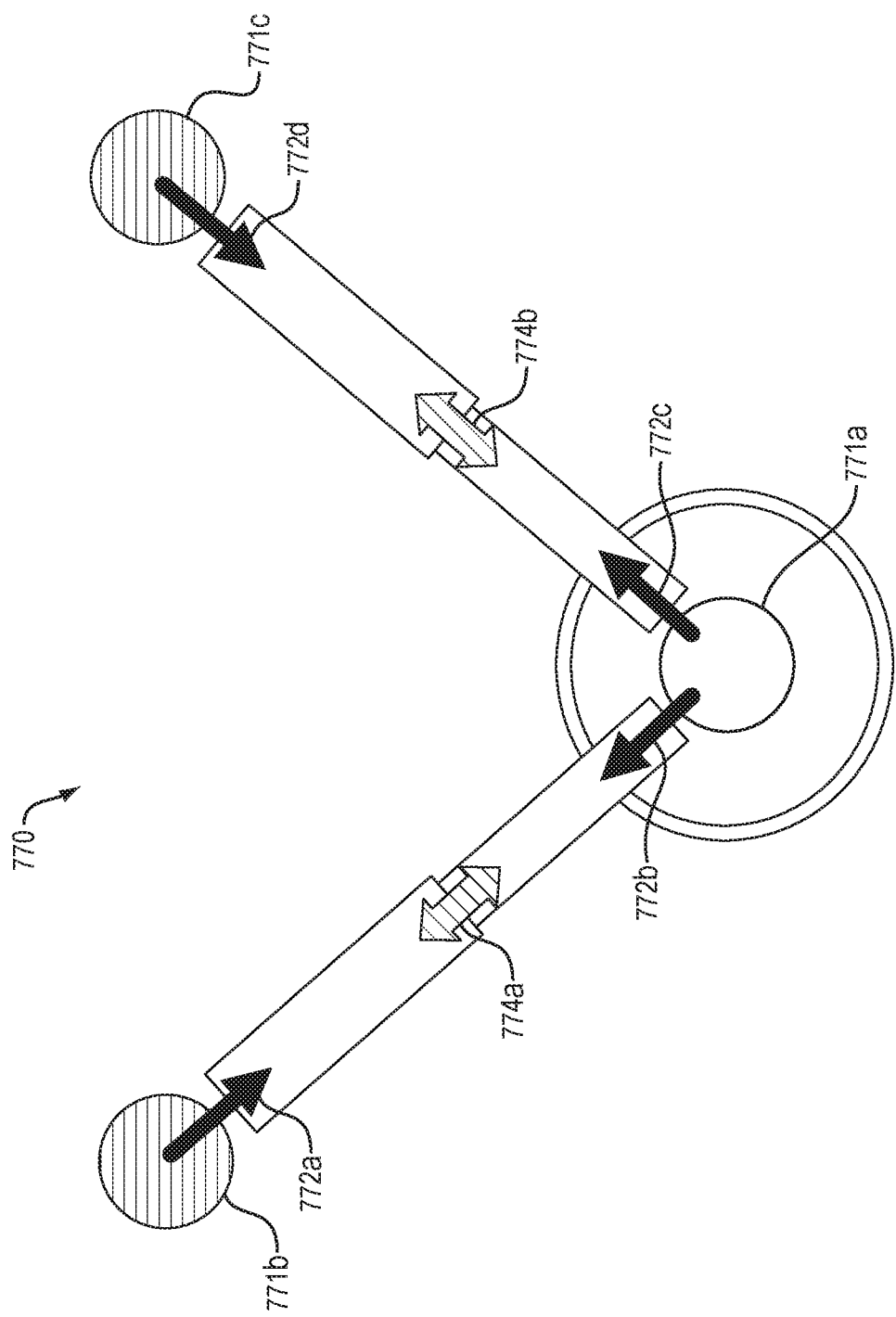
FIG. 7 depicts the physics of forces contributed by elasticity in a cable model according to an embodiment.

According to an embodiment of the method 100, the elasticity assigned to each point at step 102 is an elasticity as described hereinbelow in relation to FIGS. 5 and 7. Moreover, in an embodiment of the method 100, the torsional stiffness assigned between each point and any adjacent points is a property as described hereinbelow in relation to FIGS. 6 and 8. By adding the elasticity and torsional stiffness forces to the points at step 102, the method 100 is adding additional forces to contribute to the acceleration of each point of the polyline model.

To continue, at step 103, position and orientation of a start point and an end point of the collection of points representing the cable are defined based upon position in three dimensional space of a manufacturing resource at an end of a time step. According to an embodiment, defining the position and orientation of the start and end point of the polyline model of the cable includes storing an indication of the positions and orientations of the start and end points of the polyline model. In an embodiment, the start and end points are the points where the cable attaches to the manufacturing resource. In this way, the relationship, i.e., points of attachment, between the cable and the manufacturing resource itself are set (defined) at step 103. In addition to defining position and orientation of a start point and end point, at step 103, position and orientation of any points of the polyline model that are attached to the manufacturing resource may be defined at step 103.

To continue, at step 104 a simulation of the cable for the time step is performed. Performing the simulation at step 104 includes computing forces on each point of the collection of points. The forces are computed at step 104 using: (i) the associated point mass, (ii) the associated zero mass sphere, (iii) the assigned elasticity and torsional stiffness between the point and adjacent points, and (iv) the defined position and orientation of the start point and the end point of the collection of points. In addition to computing the forces at step 104, performing the simulation at step 104 includes determining position in three dimensional space of each point of the collection of point representing the cable at the end of the time step based on the computed forces.

In an embodiment, the forces computed at step 104 include at least one of: gravitational force on each point, elastic force on each point, torsion equivalent force pairs on each point, and collision force between each zero mass sphere at each point and an obstacle. According to an embodiment, the forces are computed at step 104 using the functionality described hereinbelow in relation to FIGS. 7 and 8. According to an embodiment, the spheres represent the outer dimension of the cable and, as such, are used to check for collisions between the point and any objects.

Performing the simulation at step 104 determines position in three dimensional space of each point of the collection of points representing the cable at the end of the time step based on the computed forces. In an example embodiment, determining the positions based on the computed forces at step 104 includes integrating accelerations and velocities due to a combination of the forces on each point to determine the position in three dimensional space of each point at the end of the time step. According to an embodiment, the acceleration on each point mass is a vector of magnitude equal to the total force on that point as computed in step 104 divided by the mass value of that point. In an embodiment, the position for each point is determined at step 104 by integrating this acceleration vector for the duration of the simulation time step so as to compute the velocity vector for each point of the polyline. The velocity vector, in turn, is then integrated for that same duration of simulation time to compute the position vector for each point of the polyline. The resulting collection of vector positions for the polyline points specify the positions in three dimensional space of each point at the end of the time step.

Another embodiment of the method 100 includes receiving user input that indicates characteristics of the environment and parameters of the simulation. In embodiments, the user input may be provided via any method known in the art, such as a graphical user interface as described hereinbelow in relation to FIG. 4. According to an embodiment, the user input indicates at least one of: cable length, cable end points, a number of points to represent the cable, cable density, stiffness of the cable, initial shape of the cable, and cable diameter. Such an embodiment may create the polyline model of the cable at step 101, or modify the model of the cable at step 102, based upon the received user input.

For instance, in an example implementation, the point mass associated with each point at step 102 is based upon the received user input indicating cable density. According to such an embodiment, the density of the cable being simulated is mapped to a mass value associated with each point at step 102. In another embodiment, the user input indicates stiffness as a percentage from 0 to 100. This stiffness is used in an embodiment to determine an equivalent point mass value and equivalent torsion spring constant between points by comparing the user stiffness input with the values for a typical robotics dress up cable corresponding to the 50% settings. A user setting of 0% implies that the equivalent torsion spring constant would be a value of zero and a user setting of 100% implies that the equivalent torsion spring constant value would be double that of the 50% setting. In another example embodiment, user input for the cable diameter is used to determine the diameter of the zero mass sphere associated with each point at step 102. For instance, user input for the diameter of the cable is set to be the diameter of the sphere associated with each point at step 102. In this way, embodiments of the method 100 take physical characteristics of the real-world cable to determine properties of the polyline model of the cable.

At step 103, according to an embodiment of the method 100, the position in three dimensional space of the manufacturing resource at an end of a time step is determined. As described herein, embodiments simulate the cable for a time step. In doing so, step 103, defines where the points that attach to the manufacturing resource will be at the end of the time step being simulated. These positions and orientations are set at step 103 because they are a product of the physics of the manufacturing resource. In such an embodiment, the motions, e.g., kinematic motions, of the manufacturing resource or robot will affect the physics of the cable, but the physics of the cable will not affect the kinematic motions of the manufacturing resource. An embodiment of the method 100 determines the position in three dimensional space of the manufacturing resource at an end of the time step by simulating the manufacturing resource. An embodiment simulates the manufacturing resource using techniques known in the art for simulating manufacturing resources. The result of such a simulation is the position (and orientation) in three dimensional space of the robot at the end of the time step and this result, in turn, is used at step 103 to define the position and orientation of the start point and end point of the collection of points (or any other points that attach to the manufacturing resource). An embodiment determines the position of the manufacturing resource using at least one of: a model of the manufacturing resource, kinematics of the manufacturing resource, motion planning for the manufacturing resource, and motion of one or more obstacles in an operating environment of the manufacturing resource. In another embodiment, the position in three dimensional space of the manufacturing resource used at step 103 is based upon settings of a model of the manufacturing resource or user input.

The position and orientation of the start point and the end point are set based on the kinematic motions of the attachment points on the associated manufacturing resource e.g. robot or machine. According to an embodiment, the position and orientation of the associated manufacturing resource at the time step being simulated is computed based on kinematics and motion planning of that particular resource as driven by a control program for the manufacturing resource. As such, the position and orientation of a manufacturing resource, and the points on the manufacturing where the cable attaches to the resource, can be determined, and used to set the position and orientation of the start point and end point of the cable or any other points of the cable that attach to the manufacturing resource at step 103. According to an embodiment, the motions of the robotic resource are defined by the position and orientation of each rigid body link of that robot resource at each time step of the simulation based on the kinematic definitions and motion planning algorithms of that particular robot resource as specified in its driving control program. The resulting change in positions of the links of the manufacturing resource at the simulation time step are determined and, in turn, affects the cable through the changed positions of the cable's end attachments and constraint connections to the robot resource which are defined at step 103. As such, motion of the manufacturing resource to a new position at an end of the time step results in a change to the polyline model (as defined in step 103) and, ultimately, updated forces being determined at step 104.

The method 100 can be used to simulate entire manufacturing, e.g., workcell, environments. As such, in embodiments, the model of the manufacturing resource (the position of which is used at step 103) can represent the manufacturing resource and the workcell environment in which the manufacturing resource operates. Such a model may include a manufacturing resource, e.g., robot, an object being operated upon, obstacles in the environment, and any other objects in the workcell environment. In this way, the method 100 can be used to simulate a manufacturing resource in a real-world environment. The model of the manufacturing resource may be any computer based model known in the art.

It is noted that because the method 100 determines, at step 104, the position in three dimensional space of each point of the cable, the simulation at step 104 is performed for a time step, i.e., a period of time. Typically, a time step is a fraction of time of an event being simulated. To illustrate, if a robot welding a car is being simulated, and the welding process takes five minutes to complete, the entire welding process can be simulated in five hundred time steps of one tenth of one second each. As such, the method 100 may also continue after step 104 to simulate the manufacturing resource including the cable for a next time step and any number of desired time steps. In an embodiment, at each time step following the time zero step, the shape of the cable at the start of method 100 would correspond to the position in three dimensional space of each cable polyline point at the end of the previous time step.

Such an embodiment updates the polyline model for the next time step being simulated. In turn, the simulation of the cable for the next time step is performed. This includes computing forces on each point of the collection of points for the next time step using: (a) the associated point mass, (b) the associated zero mass sphere, (c) the assigned elasticity and torsional stiffness between the point and adjacent points, and (d) the updated polyline model. This simulation for the next time step also determines the position in three dimensional space of each point of the collection of points representing the cable at an end of the next time step based on the forces computed using the updated polyline model. This functionality may be repeated for any number of time steps. For instance, the method 100 may continue to simulate the manufacturing resource and cable for every time step of a time period that it takes to perform a simulated operation, i.e., task.

According to an embodiment, updating the polyline model includes updating the position of each point based on the determined position in three dimensional space of each point of the collection of points at the end of the previous time step, i.e., the time step immediately before the time step being simulated. In an embodiment, updating the polyline model may include updating position and orientation of the start point and the end point of the collection of points representing the cable based upon position in three dimensional space of the manufacturing resource at the end of the next time step. Such an embodiment may further comprise determining the position in three dimensional space of the manufacturing resource at the end of the next time step by simulating the manufacturing resource. In an embodiment, the manufacturing resource is simulated using at least one of: the model of the manufacturing resource, kinematics of the manufacturing resource, motion planning for the manufacturing resource and motions (or positions) of one or more obstacles in an operating environment of the manufacturing resource. According to an embodiment, planned kinematic motions of the manufacturing resource are used to determine the position of the manufacturing resource at the end of the time step being simulated. In an embodiment, the planned kinematic motions of a manufacturing resource refer to the position and orientation of a manufacturing resource at each time step of a simulation as computed based on the kinematics and motion planning of that resource and driven by a control program for the manufacturing resource. In yet another embodiment, the updating includes updating the model of the manufacturing resource based on the planned kinematic motions of the manufacturing resource for the next time step and motions of one or more obstacles in an operating environment of the manufacturing resource.

Results of the simulation performed at step 104 can be used to modify a real-world environment. For example, results, e.g., determined positions, can be used to modify the manufacturing resource, the cable, the environment in which the manufacturing resource operates, and operations of the manufacturing resource, amongst other examples. To illustrate, it may be identified from the positions determined at step 104 that given the stiffness of the cable, the cable collides with the robot during the time step. As a result of this determination, the stiffness of the cable may be updated in the simulation and the simulation may be performed to determine that the cable and robot no longer collide. In the real-world environment, the cable can be made to have the same stiffness as determined in the simulation. Similarly, the simulation may determine alternative movements or operations of the robot so as to avoid collisions. Further, the method 100 can be performed iteratively to determine optimal properties of the robot, cable, and environment that are optimized in accordance with parameters set by a user. For instance, one such example may determine the minimal cable diameter (so as to minimize costs) that does not collide with the manufacturing resource. The method 100 can be performed with varying cable diameters until the minimal cable diameter is determined.

Hereinbelow, steps (1-12) of an example implementation simulating a manufacturing resource according to an embodiment are described. However, it is noted that embodiments of the present invention are not limited to the implementation described below. For instance, embodiments may include more or less steps, the steps may be executed in a different order than described, and steps may be executed simultaneously, amongst other variations.

Step 1

Figure 2:
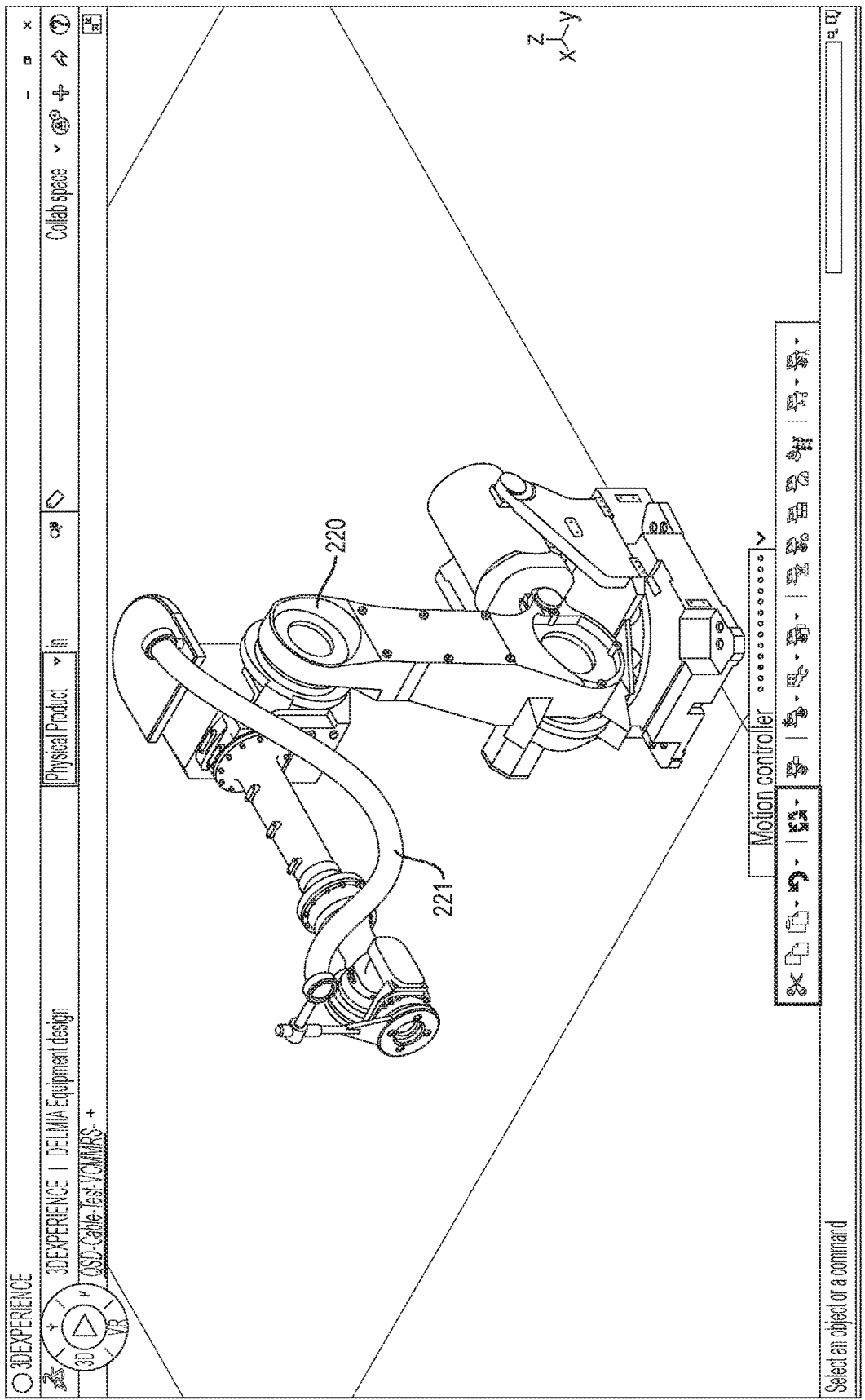
FIG. 2 illustrates a manufacturing resource and associated cable that may be simulated using embodiments.

Embodiments simulate a manufacturing resource that includes a cable. FIG. 2 illustrates a 3D model 220 of a manufacturing resource that includes the cable 221 that can be simulated using embodiments. While FIG. 2 illustrates an example model 220, embodiments can operate with any computer based model known in the art. Moreover, the models used in embodiments can represent any object. As such, embodiments can be used to simulate any object that includes a cable, e.g., the cable 221.

The model 220 is an example CAD model that may be used in embodiments to simulate behavior of the manufacturing resource that the model 220 represents. Simulation of the manufacturing resource using the model 220 can determine the movements of the resource represented by the model 220 and the cable 221 while performing a task, e.g., assembling a car. Moreover, results of the simulation can be used to create operating controls and programming for the real-world operation of the manufacturing resource.

Figure 3:
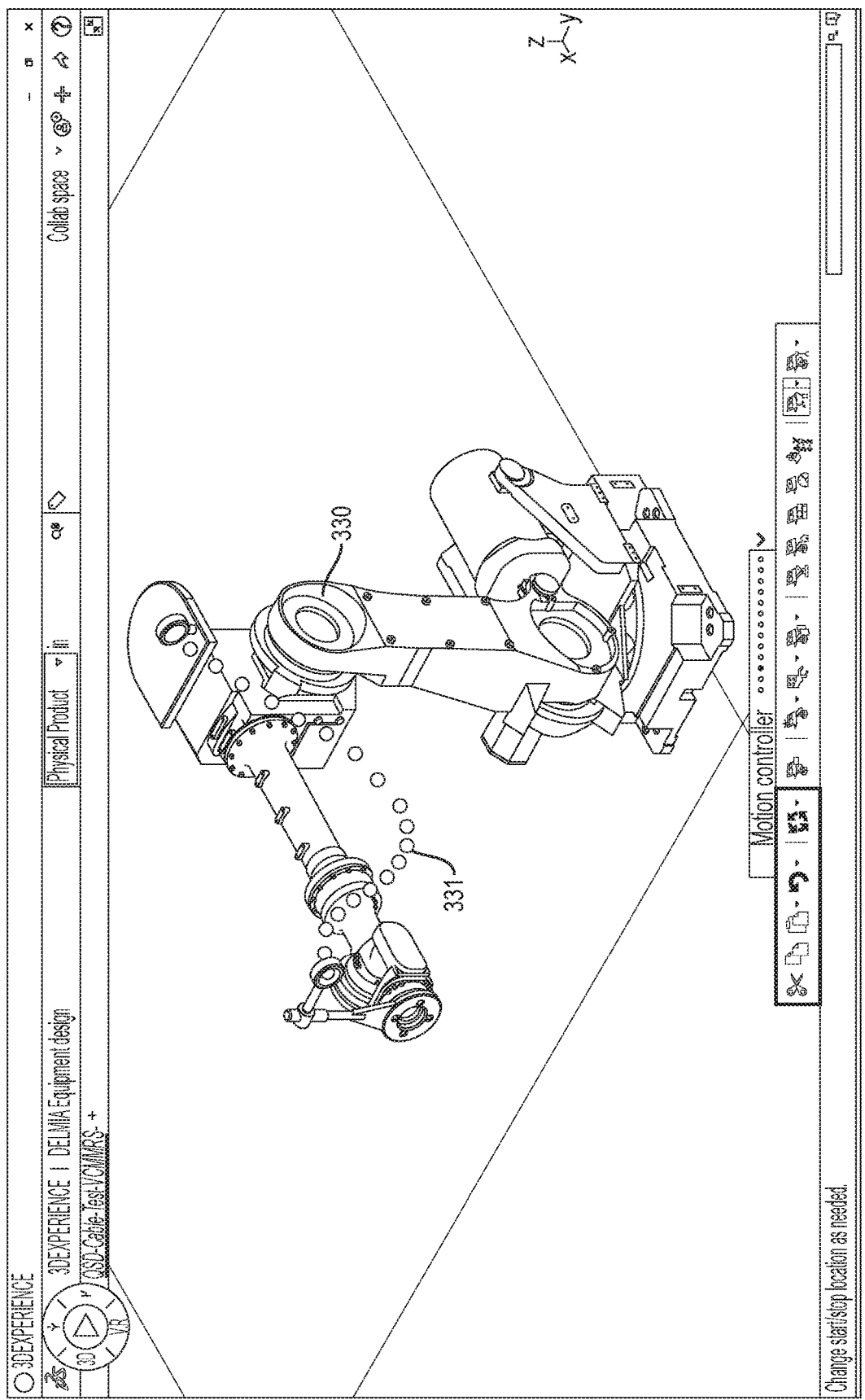
FIG. 3 depicts a CAD model with a cable model created according to an embodiment of the present invention.

In order to simulate an object represented by a model, e.g., the model 220, at step 1 an embodiment creates a 3D mathematical polyline model for the cable, e.g., the cable 221, based on user inputs. The model of the cable is a collection of points constrained by attachment physics. The user inputs that may be used to create a model of the cable may include any features of the cable, such as length, number of segments, and initial shape. FIG. 3 depicts a CAD model 330 of a manufacturing resource and a 3D mathematical polyline model 331, according to an embodiment that represents a cable.

Figure 4:
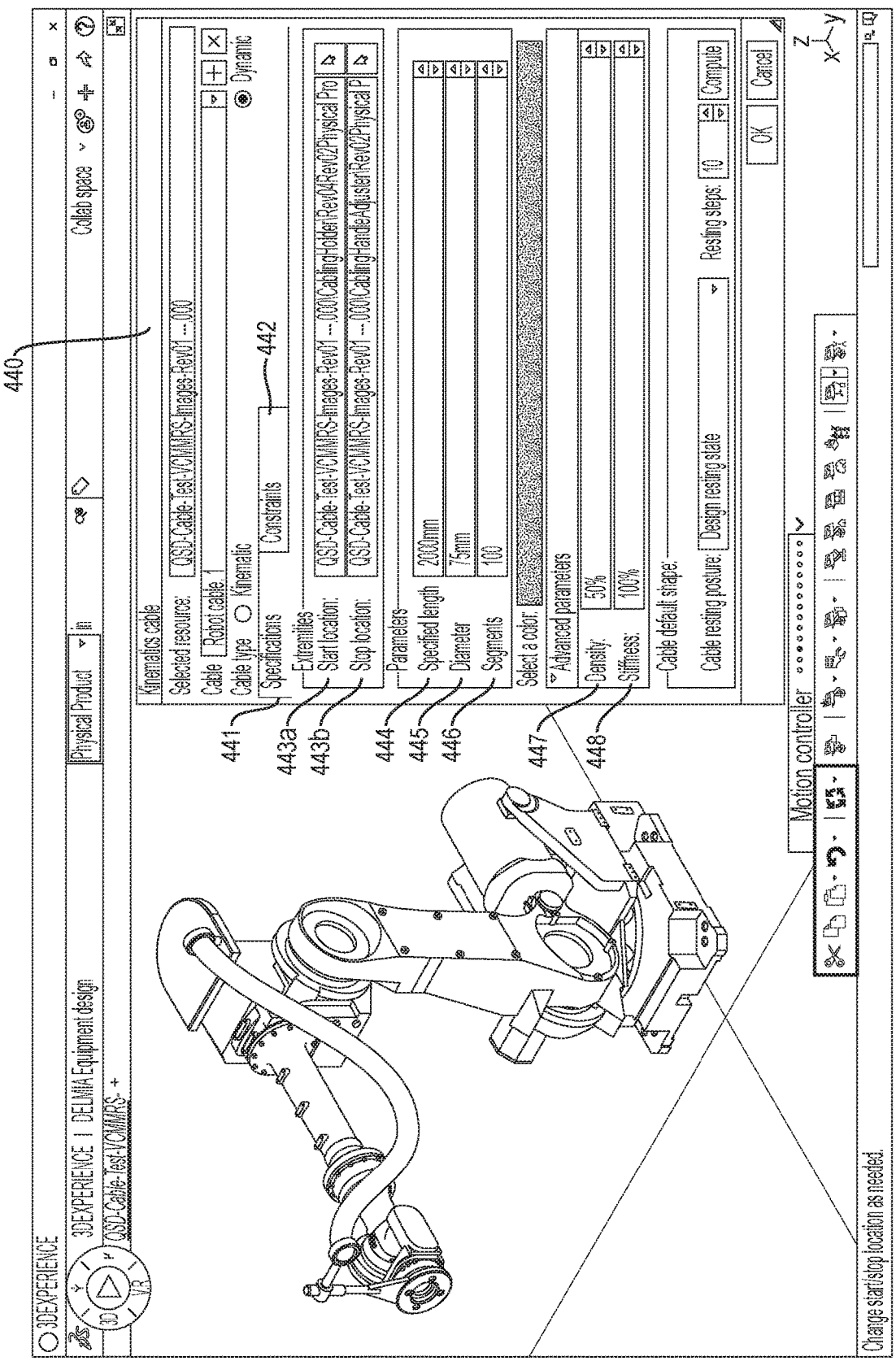
FIG. 4 portrays a model and user interface for defining properties of the model for a simulation implemented according to an embodiment.

As noted above, embodiments create a polyline model that represents a cable and the polyline model may be created based upon user input. FIG. 4 illustrates a user interface 440 that can be implemented in embodiments to allow users to provide specifications 441 and constraints 442 for creating a polyline model, e.g., the model 331, of a cable. The user can provide a start location 443a, stop location 443b, length 444, diameter 445, segments 446, i.e., the number of points to use in the polyline model, density 447, and stiffness 448 of the cable. In an embodiment, the constraints 442 of the cable are locations along the length of the cable where the cable is attached to the manufacturing resource so as to match the actual cable configuration on the real world machine, e.g. robot.

Step 2

To continue, after creating the polyline model that includes a collection of points, a virtual point mass of non-zero density is assigned to each point of the polyline model. In an embodiment, the mass and density of the point mass is based upon user input. Further, in an embodiment, the mass and density of the point mass is based upon properties, e.g., materials, of the real-world cable being simulated.

Step 3

Next, a zero mass sphere is associated with each point of the polyline model. According to an embodiment, the zero mass spheres associated with each point of the polyline model have the same diameter as the cable being simulated. In embodiments, diameter information may be received from a user via a user interface 440 or the like, for non-limiting example. By associating a sphere with the same diameter as the cable, embodiments can identify any possible collisions between the cable and objects. The collisions between the cable and objects in the environment may be determined in an embodiment using standard technologies which are part of a manufacturing simulation system. According to an embodiment, such a manufacturing simulation system checks for cable collisions by invoking a built-in utility for minimum distance testing between objects. In an embodiment, this testing is performed at each time step for each sphere at each polyline point, and the testing checks each sphere against all potential collision objects in the simulated manufacturing workcell. If the minimum distance for any sphere with respect to any other object is zero or negative that would imply that a collision at the cable point with depth and direction information as returned by the minimum distance utility.

Step 4

To continue, the polyline model is enhanced by associating cable end positions and orientations from a model of the manufacturing resource with the polyline model start and end point locations and directions. In other words, at step 4, the locations in 3D space where the cable attaches to the manufacturing resource model are known (from user input or settings of a model of the manufacturing resource) or determined (e.g., by performing a simulation), and start and end points of the polyline model are assigned as having these start and end locations in 3D space. In this way, the model of the cable is associated with the model of the manufacturing resource such that the kinematic motions of the manufacturing resource at each time step are associated with appropriate changes in the cable end point locations and orientations. In an embodiment, there is also a similar association between any optional constraint points along the length of the cable (e.g., another point of attachment between the cable and robot) and any motions of the related manufacturing resource.

Step 5

At step 5, each point mass of the polyline model is associated with an external gravitational acceleration. According to an embodiment, the external gravitational acceleration acts downward on each point as per the physical world coordinates vertical direction of the manufacturing resource workcell being simulated.

Step 6

At step 6, a virtual elasticity, i.e., linear elasticity is assigned to each segment of the polyline model, i.e., between points that are immediately next to each other (adjacent). In other words, at step 6, an elasticity constraint between adjacent points is set up so as to generate virtual elastic forces between the points. In this way, constraints are applied to the points that define an interaction between the points.

As described above, in embodiments the polyline model representing the cable is a collection of points. At step 6, a property, i.e., elasticity, governing the relationship between the points is set. FIG. 5 is a conceptual illustration of this elasticity property in a cable model 550 according to an embodiment. The cable model 550 is a polyline model composed of three points 551a-c. At step 6, the elastic forces 552a-d between each point 551a-c are defined. In this way, a virtual spring force is created between adjacent points. This force is called virtual, because it is a construct/approximation that is used to define the behavior of the cable, but it is not necessarily based on physics of the real-world cable being simulated. In other words, where a differential equation may be based on the exact physical properties of the cable, rather than using differential equations, embodiments utilize the virtual forces to simulate behavior.

To illustrate, the point 551a is assigned an elastic force 552a which contributes to a spring force 553a between the point 551a and the adjacent point 551b. The point 551b is adjacent to both the point 551a and the point 551c. As such, the elastic force 552b (which contributes to the spring force 553a) is assigned to the point 551b and the elastic force 552c (which contributes to the spring force 553b) is assigned to the point 551b. The point 551c is assigned the elastic force 552d which contributes to the spring force 553b between the point 551c and the adjacent point 551b.

In addition to the elastic forces 552a-d, additional forces may be associated with the points 551a-c of the polyline model 550. For instance, in the model 550 neighboring elastic forces 554a and 554b are assigned to the points 551a and 551c, respectively. These additional elastic forces are the elastic forces contributed by the spring force between the point 551a and the point preceding the point 551a and the spring force between the point 551c and the point following the point 551c based on their own linear elasticity parameters. Moreover, each point 551a-c has an associated gravity force 555a-c that represents the force of gravity on the points 551a-c. FIG. 5 also depicts zero mass spheres 557a-c that are associated with the points 551a-c, respectively. Each point 551a-c may also have an associated external collision force 556a-c. According to an embodiment, the collision force 556a-c is a virtual force applied to a point 551a-c in case the zero mass sphere 557a-c associated with that point 551a-c happens to collide with any object in the environment at any time step during the simulation. The directions of the collision forces 556a-c are normal to the surface of the spheres 557a-c at the points of contact. The magnitude of the collision forces 556a-c is proportional to the depth of penetration with the colliding object at that time step of the simulation. The constant of proportionality when computing the magnitude of the collision forces 556a-c is the same as the value of the linear elasticity parameter of the cable.

Step 7

At step 7, a virtual torsional stiffness is assigned to each pair of adjacent polyline segments of the polyline model, i.e., between points that are immediately next to each other (adjacent). In other words, at step 7, a torsional stiffness constraint between adjacent points is set up so as to generate virtual torsional forces between the points. In this way, another constraint is applied to the points that further defines interactions between the points of the polyline model.

As described above, the polyline model is a collection of points representing the cable. At step 7, another property of the relationship between the points is set, specifically, torsional stiffness. FIG. 6 is a conceptual illustration of torsional stiffness in a cable model 660 according to an embodiment. The cable model 660 is composed of three points 661a-c. At step 7, the torsional stiffness between each point 661a-c is defined. FIG. 6 also depicts zero mass spheres 667a-c that are associated with the points 661a-c, respectively.

To illustrate, in the model 660 a torsion equivalent force pair is set between the point 661a and the point 661b by assigning the torsion force 662a to the point 661a and the torsion force 662b to the point 661b. Moreover, the neighboring torsion forces 663a-b are assigned to the point 661a. These additional torsion forces 663a-b are the forces contributed by the force pair between the point 661a and the point preceding the point 661a. In this way, the torsion forces 662a and 663a-b can with this innovative new approach, effectively duplicate the physics of a virtual spring torsion 664a on the point 661a.

As noted above, a torsion equivalent force pair is set between the point 661a and the point 661b by assigning the torsion force 662a to the point 661a and the torsion force 662b to the point 661b. Further, the point 661b is also adjacent to the point 661c and a torsion equivalent force pair is set between the point 661b and the point 661c by assigning the torsion forces 662c to the point 661b and the torsion force 662d to the point 661c. For the point 661b the torsion forces 662b-c associated with the point 661b can, with this innovative new approach, effectively duplicate the physics of a virtual spring torsion 664b.

A torsion equivalent force pair is set between the point 661c and the point 661b by assigning the torsion forces 662d to the point 661c and the torsion force 662c to the point 661b. The point 661c is also assigned the neighboring torsion forces 663c-d. These additional torsion forces 663c-d are the forces contributed by the force pair between the point 661c and the point following the point 661c, i.e., the other point adjacent to the point 661c that is not shown in FIG. 6. For the point 661c the torsion forces 662d and 663c-d can with this innovative new approach, effectively duplicate the physics of a virtual spring torsion 664c on the point 661c.

Step 8

At step 8, the forces for each point, are computed based on the point mass of each point, the zero mass sphere of each point, and the current shape of the cable. According to an embodiment, calculating the forces for a point at step 8 includes: (1) computing virtual gravitational force on the point mass, (2) computing the virtual elastic forces on the point mass based on the positions of the point mass's immediate neighbors, (3) computing the virtual torsion equivalent force pairs on the point mass based on positions of the previous, current, and next virtual point masses, and (4) computing any possible collisions forces between the zero mass sphere of the point and the robotic manufacturing resources as well as the workcell environment. In turn, accelerations of the points can be determined from the forces using an F=ma approach as follows. According to an embodiment, the resulting acceleration on each point mass is a vector of magnitude equal to the total summation of all of the above forces on that point divided by the mass value of that point. This highly efficient approach to computation of accelerations is made possible by the innovative approach of modeling the cable with zero diameter point masses along with zero mass collision spheres. Zero diameter point masses in this approach do not have any moment of inertia and hence the physics of the system consists purely of linear velocities and accelerations of a collection of points without needing additional complexity and computation required to account for angular velocities and angular accelerations.

Figure 8:
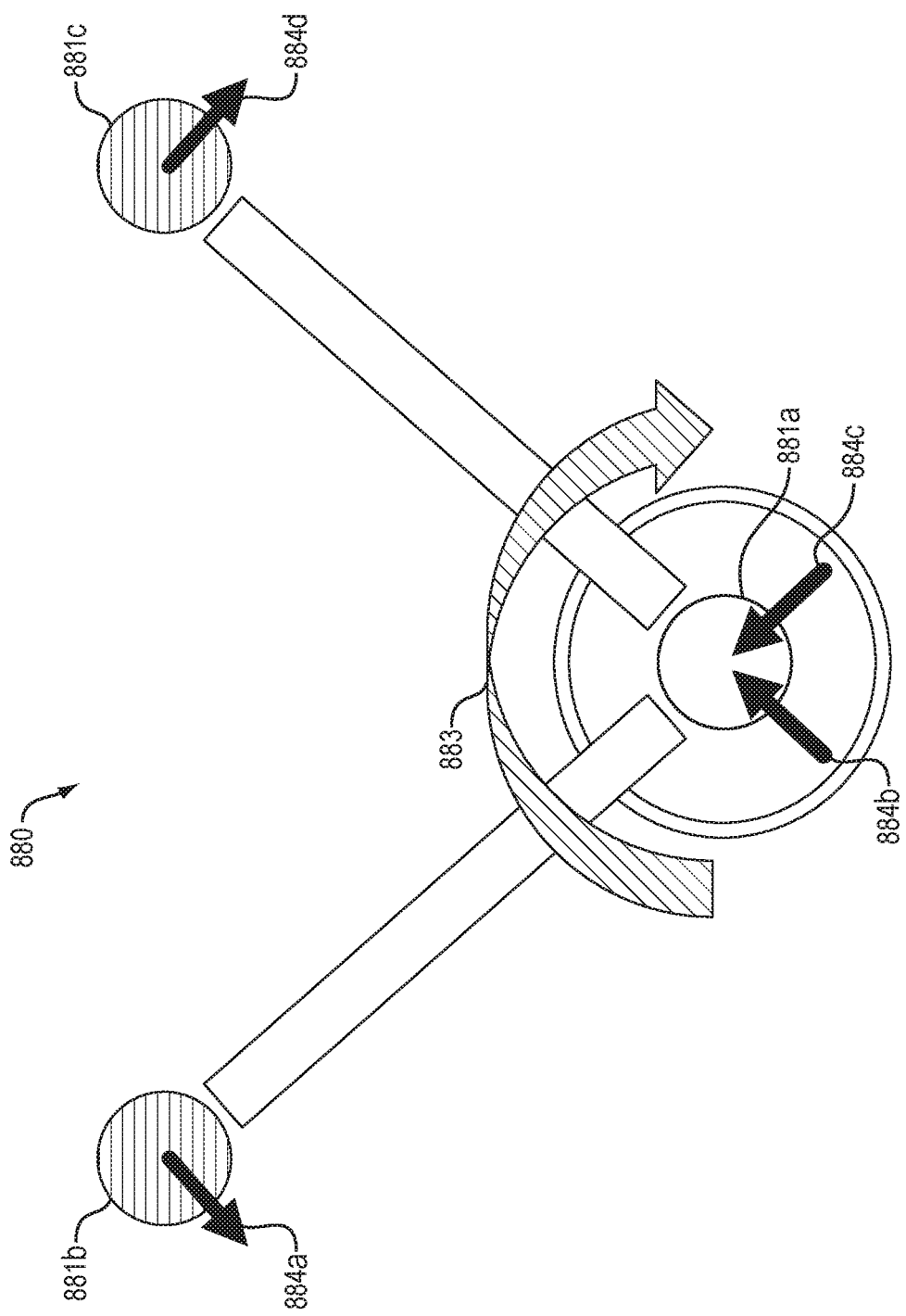
FIG. 8 depicts the physics of the forces contributed by stiffness in a cable model according to an embodiment.

According to an embodiment, the forces are computed according to the functionality described hereinbelow in relation to FIGS. 7 and 8.

One operation that may be performed at step 8 is computing the virtual elastic forces on the point masses. FIG. 7 depicts an example of computing the elastic forces 772a-d associated with the point mass 771a of the cable model 770 according to an embodiment. In the model 770 there is a virtual spring force 774a between the point masses 771a and 771b that is proportional to the change in default polyline distance between the point mass 771a and the point mass 771b. Likewise, there is a virtual spring force 774b between the point mass 771a and the point mass 771c that is proportional to the change in default polyline distance between the point mass 771a and 771c. In embodiments, the spring forces 774a-b are manifested as a pair of elastic forces, where one elastic force of each pair is on a respective point mass. According to an embodiment, the force pairs are equal in magnitude and opposite in 3D vector direction aligned with the direction between adjacent points and one force of the pair is applied to each of the pair of adjacent points. The constant of proportionality when computing the magnitude of the forces is the same as the value of the linear elasticity parameter of the cable. In FIG. 7, the spring force 774a is manifested as the pair of elastic forces 772a-b, where the elastic force 772a is associated with the point mass 771b and the elastic force 772b is associated with the point mass 771a. Moreover, the spring force 774b is manifested as the pair of elastic forces 772c-d, where the elastic force 772c is associated with the point mass 771a and the elastic force 772d is associated with the point mass 771c. In the model 770, the elastic force pairs are applied to each corresponding point sphere. Thus, in FIG. 7, the forces 772b and 772c are applied to the point 771a. In this way, embodiments create the spring forces 774a-b on the point 771a. According to an embodiment, the forces 772a-d are computed in full 3D along the length of the cable 770, which may be curved. This implies that each force pair, such as 772a-b and 772c-d have vector directions in 3D based on the locations in 3D of the adjacent point which in turn will be recomputed at every simulation time step based on the current 3D shape of the point mass polyline at that simulation step.

Another operation that may be performed at step 8 is computing the torsion force on a point based on the torsional stiffness between the point and adjacent points. According to an embodiment, the stiffness induced torsional moment on a point can with this innovative new approach be effectively duplicated by a pair of torsion equivalent forces on the point of the polyline model. FIG. 8 depicts an example of computing the torsional moment 883 on the point 881a that is part of a cable model 880 according to an embodiment. For the model 880 each sphere 881a-c generates a virtual torsion that is proportional to the change in 3D angle from the initial zero degrees straight line alignment between each point mass and neighboring point masses. The constant of proportionality when computing the magnitude of the torsion moment is the same as the value of the torsional stiffness parameter of the cable. For instance, in FIG. 8 the torsional moment 883 between the point mass 881a and the neighboring point masses 881b and 881c is duplicated as a pair of forces 884a-b each on the point mass 881a-b such that the desired torsional moment 883 is equal to the magnitude of force 884a or 884b, times the distance between the point mass 881b and point mass 881a. In this implementation, the force pairs 884a-b can be applied to the point masses 881a-b. Specifically, the force 884a is applied to the point mass 881a and the force 884b is applied to the point mass 881a. Similarly, the force 884c is applied to the point mass 881a and the force 884d is applied to the point mass 881c. For such an embodiment, the force vectors may be computed in full 3D along the length of the cable 880. According to an embodiment, the vector directions of the torsion equivalent forces are perpendicular to the 3D vector direction between the point and its adjacent point. This implies that each force pair such as 884a-b and 884c-d will have vector directions in 3D based on the locations in 3D of the adjacent point which in turn will be recomputed at every simulation time step based on the current 3D shape of the point mass polyline at that simulation step.

Step 9

Step 9 integrates the physics (accelerations and velocities) of the aforementioned virtual cable system for one time step of the simulation. Integrating the 3D acceleration vector for each point mass determines the 3D velocity vector for that point mass, and integrating the 3D velocity vectors for the points allows the 3D position vector of the points of the cable to be determined. In this way, the accelerations produced by the system of forces at each point mass resolve into new 3D position locations for each point mass which results in a new virtual cable shape at the end of the time step. The integrations of the acceleration vectors and the velocity vectors are done for the duration of each simulation time step. The resulting collection of position vectors for the polyline points is then able to specify the cable shape based on the position in three dimensional space of each point at the end of that time step.

Step 10

To continue, the positions and orientations of the cable ends are updated based on the locations determined during step 9 and the planned kinematic motion of the robotic manufacturing resource in preparation for the next time step of the simulation. The planned kinematic motions of the robotic manufacturing resources are defined by the position and orientation of each rigid body link of the associated robotic manufacturing resource at each time step of the simulation as computed based on the kinematic definitions and motion planning algorithms of that particular robot resource as specified in its driving control program.

Step 11

In turn, at step 11, the virtual workcell environment in the simulation is updated with any additional kinematic motions of machines, tools, or resources that may be running their own programs and could interact (e.g., collide or constrain) with the virtual cable that is being simulated.

Step 12

At step 12, steps 8, 9, 10, and 11 are repeated for each time step of the duration of the entire manufacturing simulation as it progresses from start to finish. In this way, such an embodiment can simulate an entire manufacturing process.

According to an embodiment, for each simulation time step: (1) robot links are first moved based on pure kinematics and motion planning, (2) this robot movement then implies a change in the cable end positions (and any potential cable along-the-length constraints or possible cable collisions), (3) the changed cable end positions (and constraint and collisions) cause forces to be generated on the cable first start point and cable last end point (and any intermediate cable points affected by constraints or collisions), (4) the combination of these "external" cable attachment end forces (and any constraint forces and any collision forces) along with the cable "internal" force generated by gravity, linear elasticity, and torsional stiffness, all together produce a summation of accelerations on each and every cable point, and (5) the total 3D vector acceleration of each point is integrated twice, first to get the 3D velocity and second to determine the 3D position of the point. This approach is computationally very lean because the forces and accelerations and velocities are limited to 3D points without any moment of inertia matrices or the additional three dimensions of angular accelerations and velocities.

Figure 9:
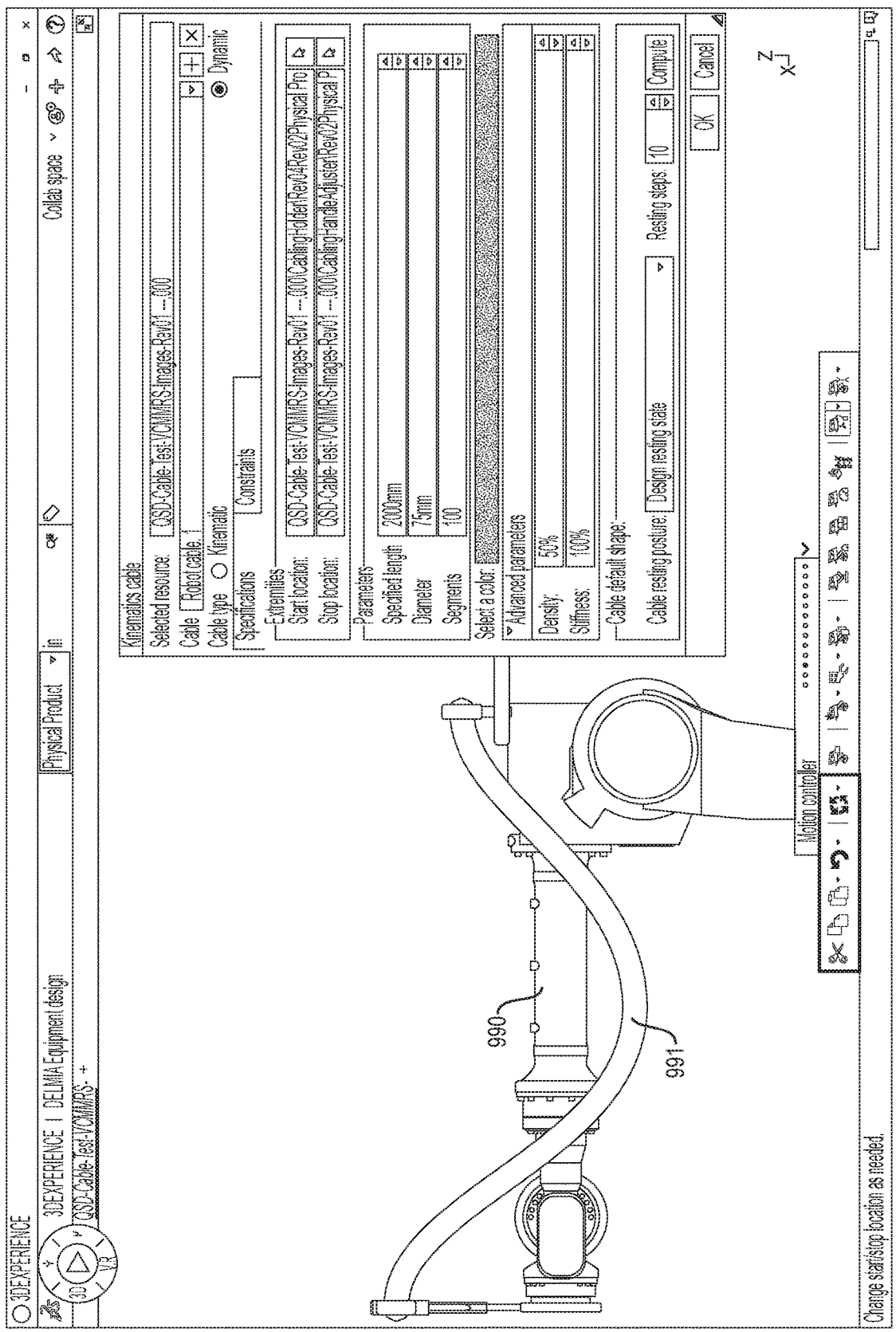
FIG. 9 illustrates a model of a robot with a cable having a stiffness defined according to an embodiment.

As described above, embodiments allow a user to define stiffness of the cable being simulated. FIG. 9 illustrates a model 990 of a robot with a cable 991 having a stiffness defined according to embodiments.

Figure 10A:
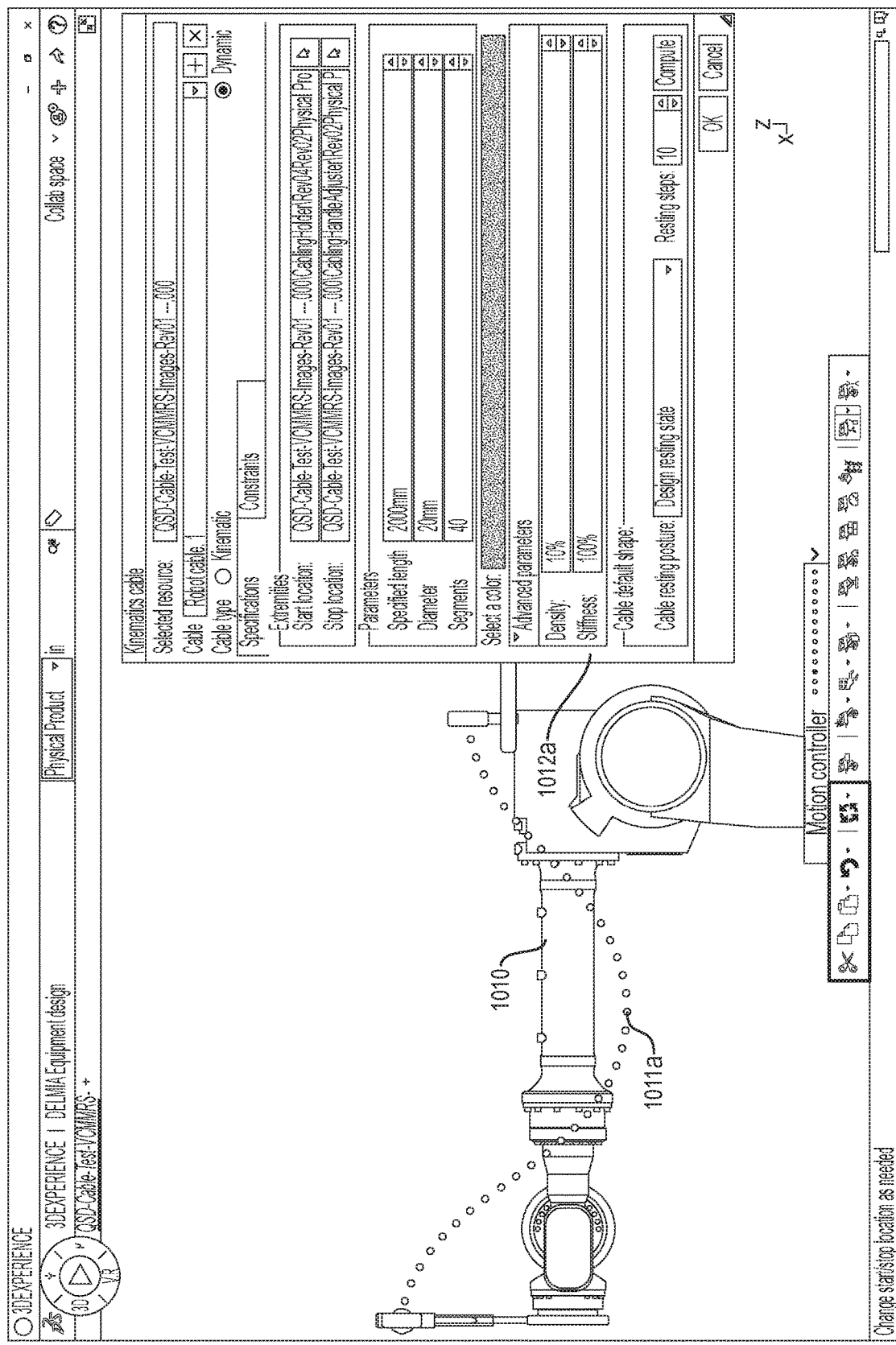
FIGS. 10A-C portray the outline of cables with varying stiffnesses that can be simulated using embodiments.
Figure 10B:
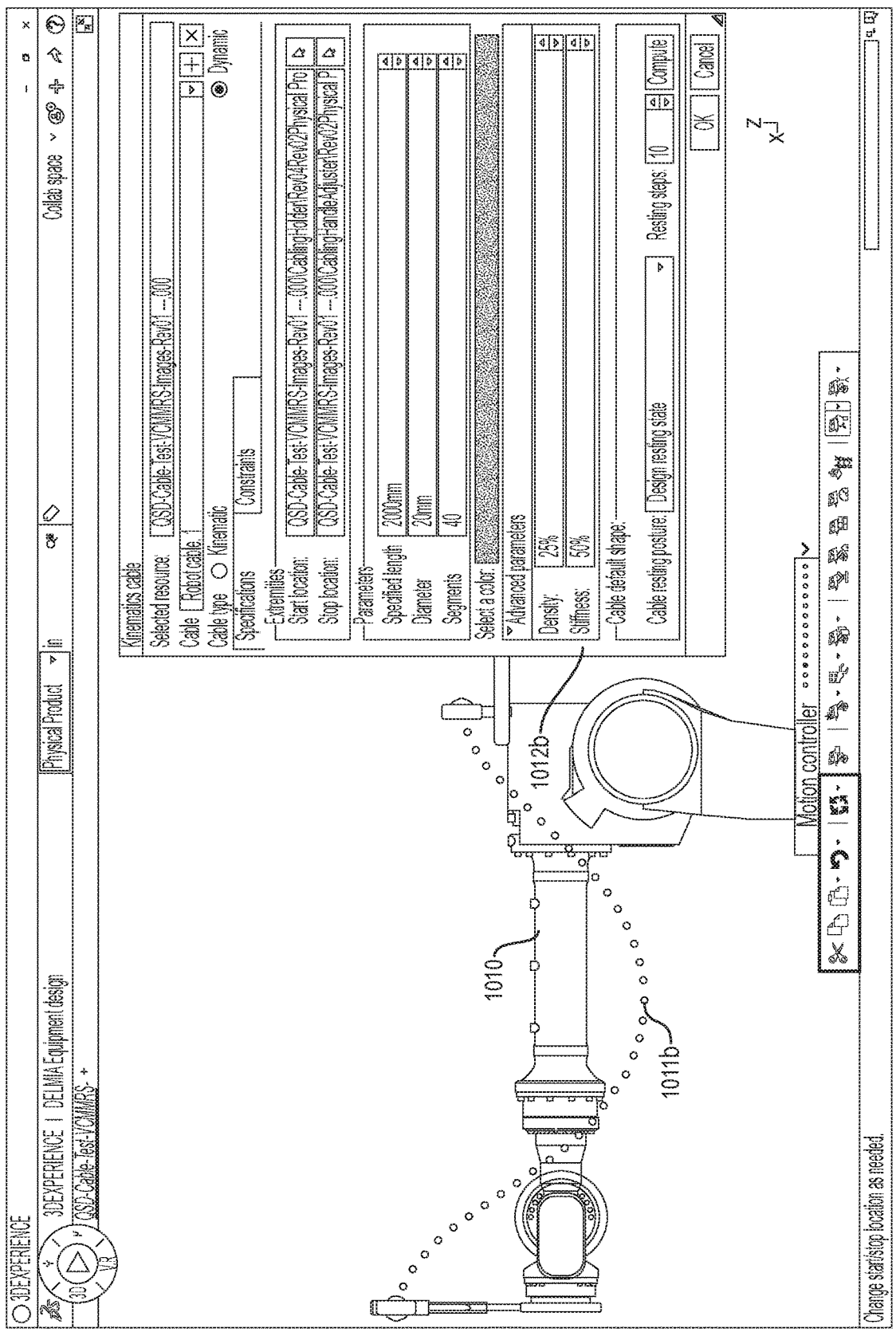
Figure 10C:
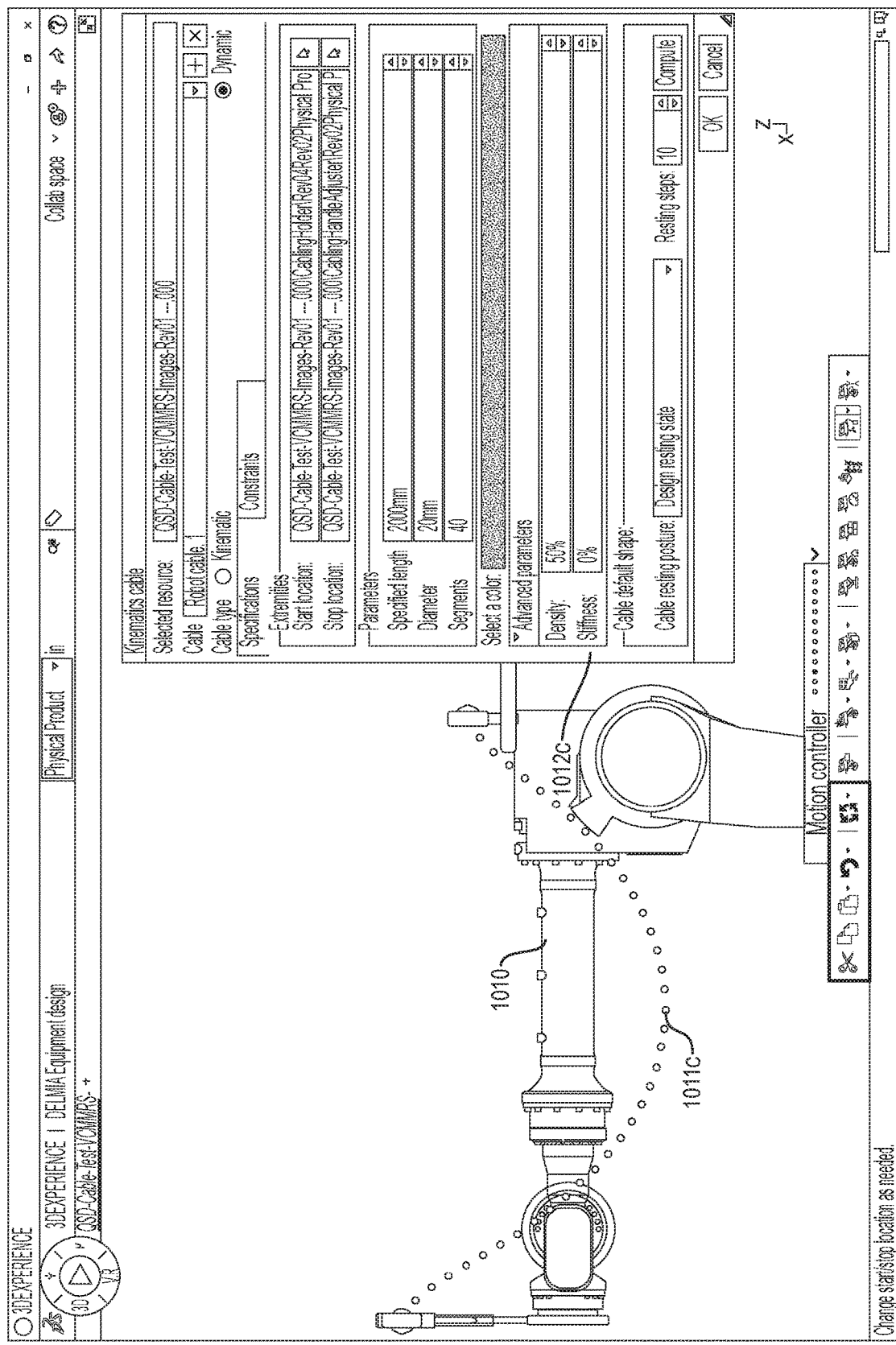

In embodiments, the cable stiffness can vary from a user specified minimum (where zero stiffness corresponds to a catenary curve) to a user specified maximum. FIGS. 10A-C portray the model 1010 of a manufacturing resource with the cables 1011a-c each having a different stiffness. In FIG. 10A the cable 1011a has 100% stiffness as assigned at 1012a. In FIG. 10B the cable 1011b has 50% stiffness as assigned at 1012b and in FIG. 10C the cable has 0% stiffness as assigned at 1012c. As can be seen in FIG. 10C, a stiffness of 0% results, as would be desired, in the shape of a catenary.

Figure 11A:
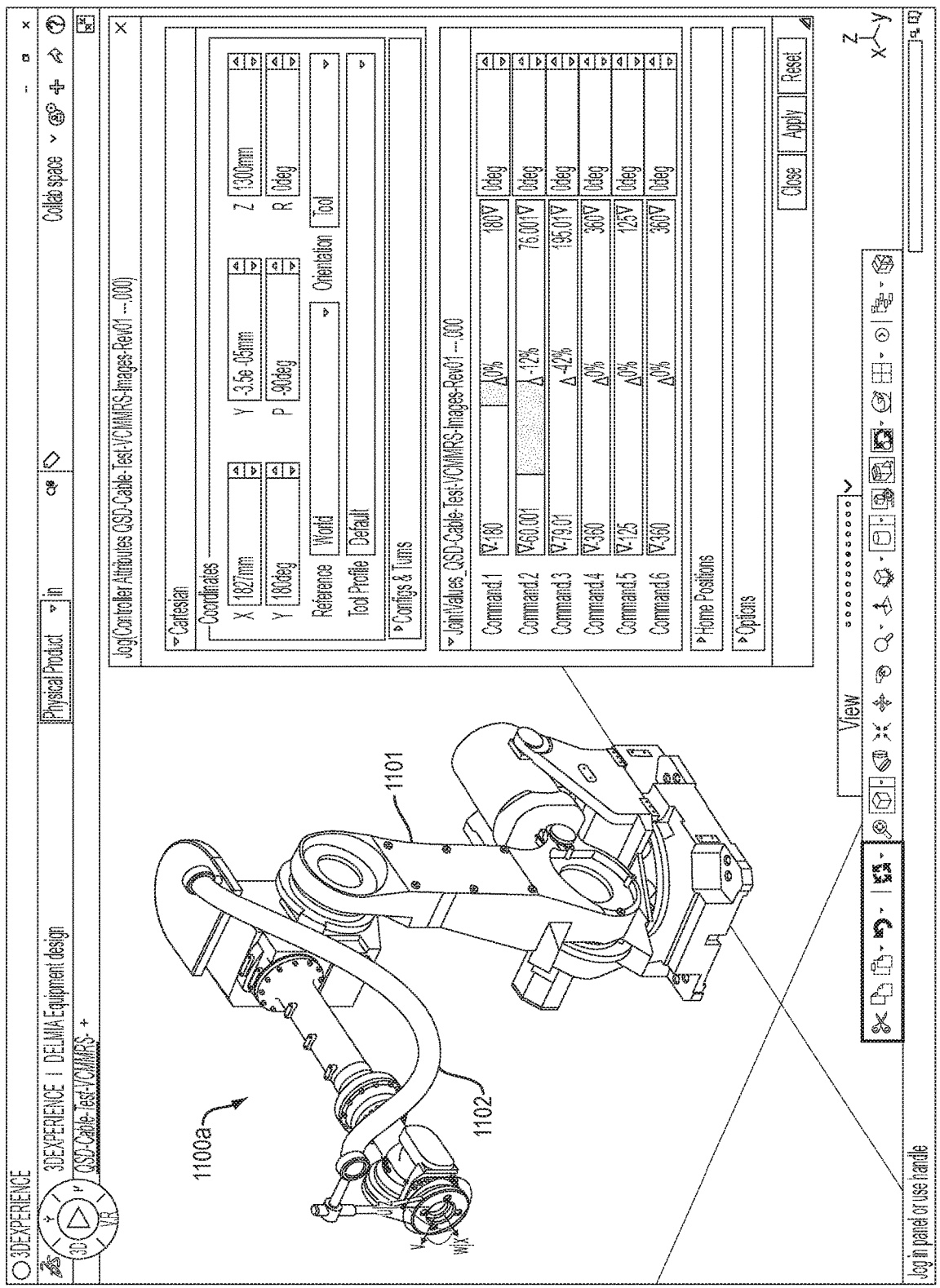
FIGS. 11A-G illustrate various manufacturing resource configurations that may be simulated using embodiments of the present invention.
Figure 11B:
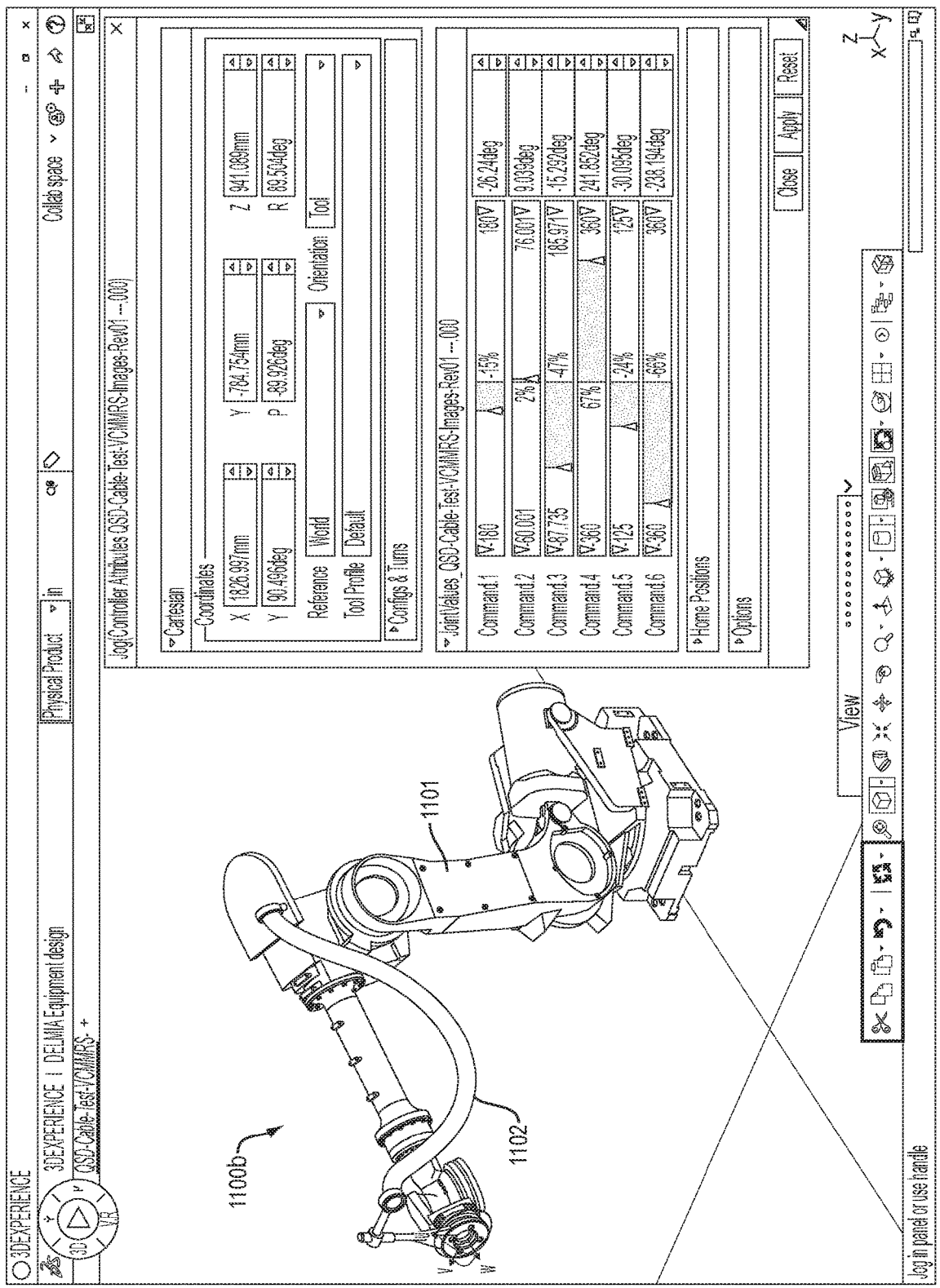
Figure 11C:
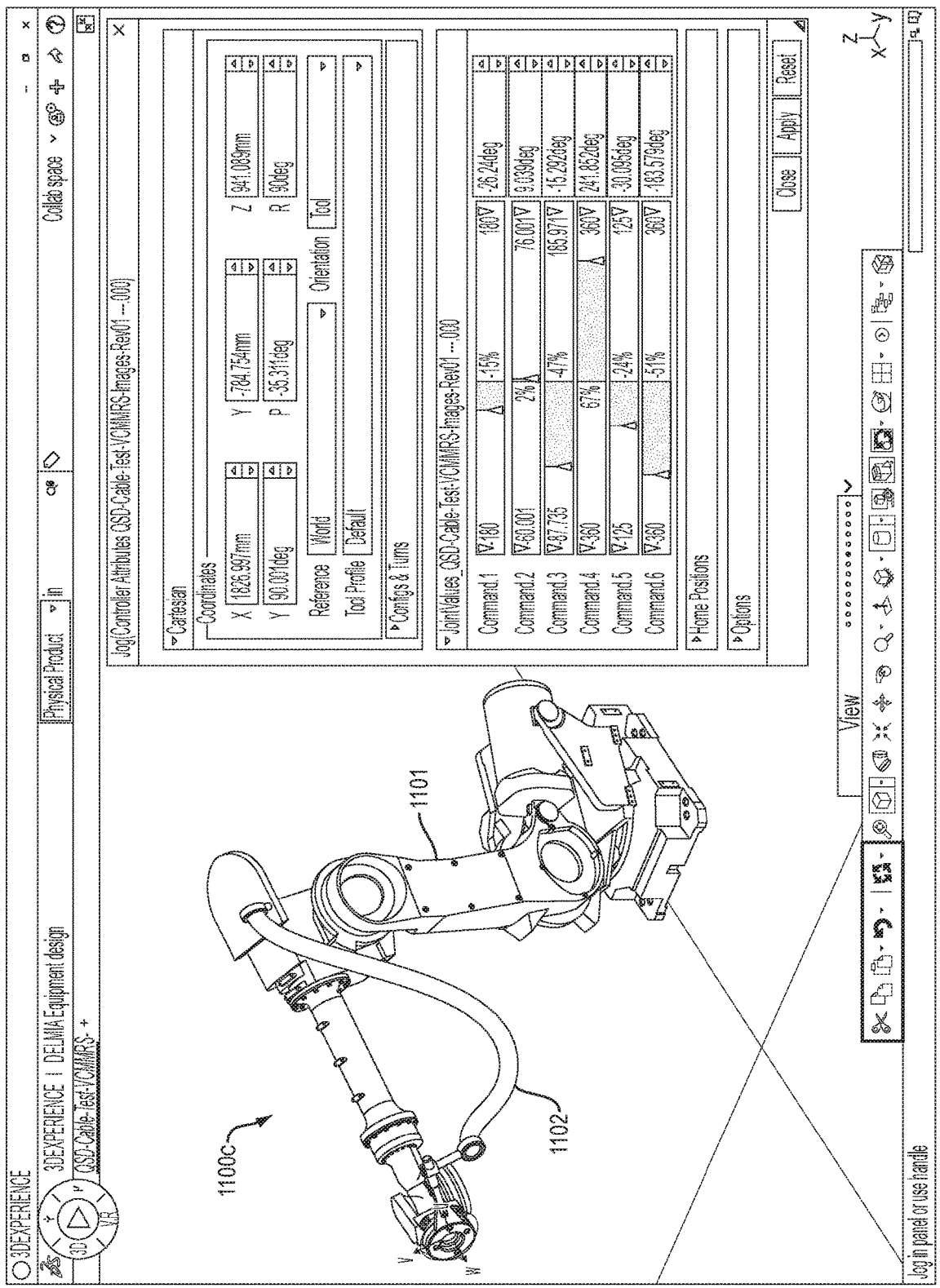
Figure 11D:
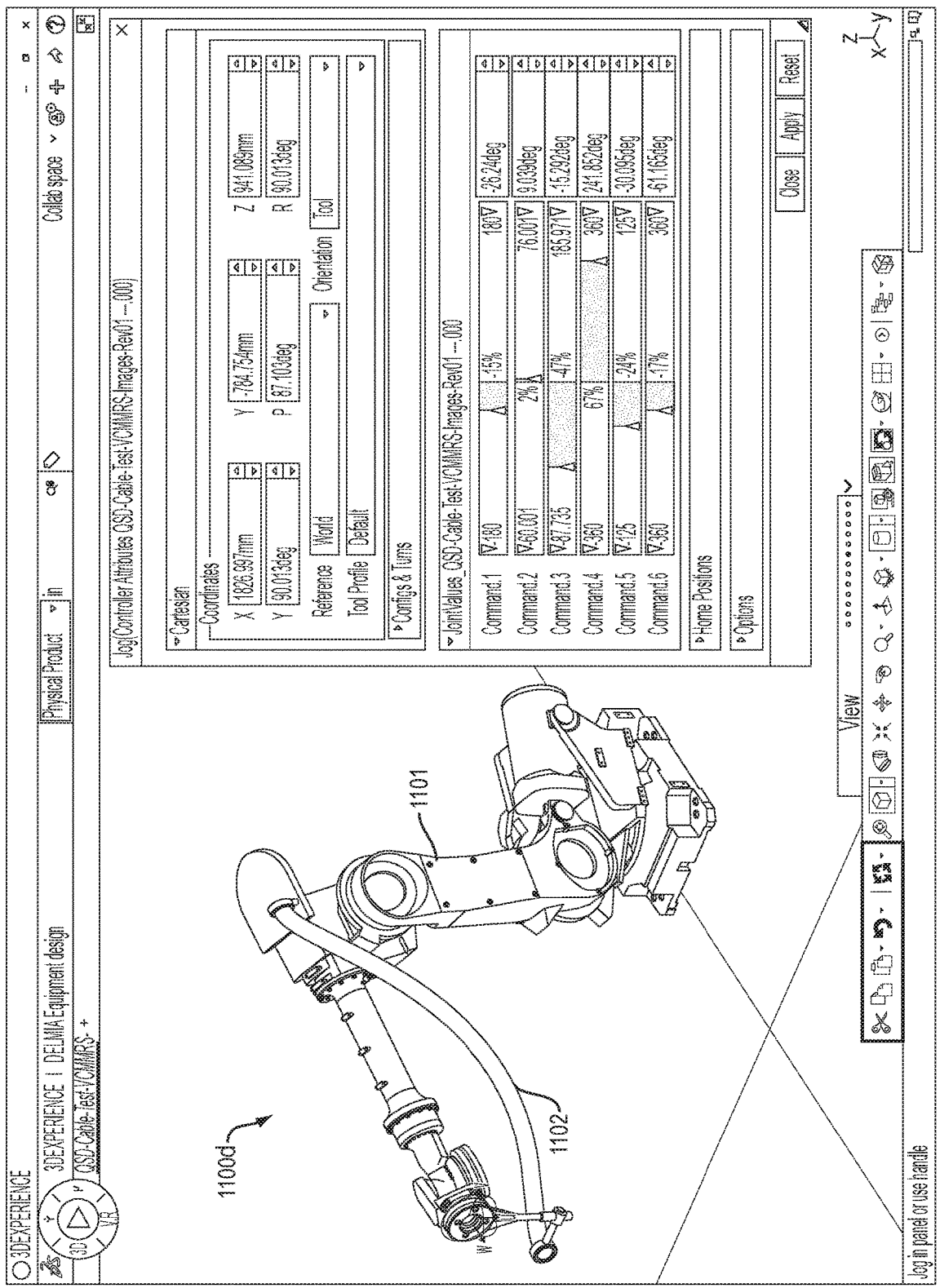
Figure 11E:
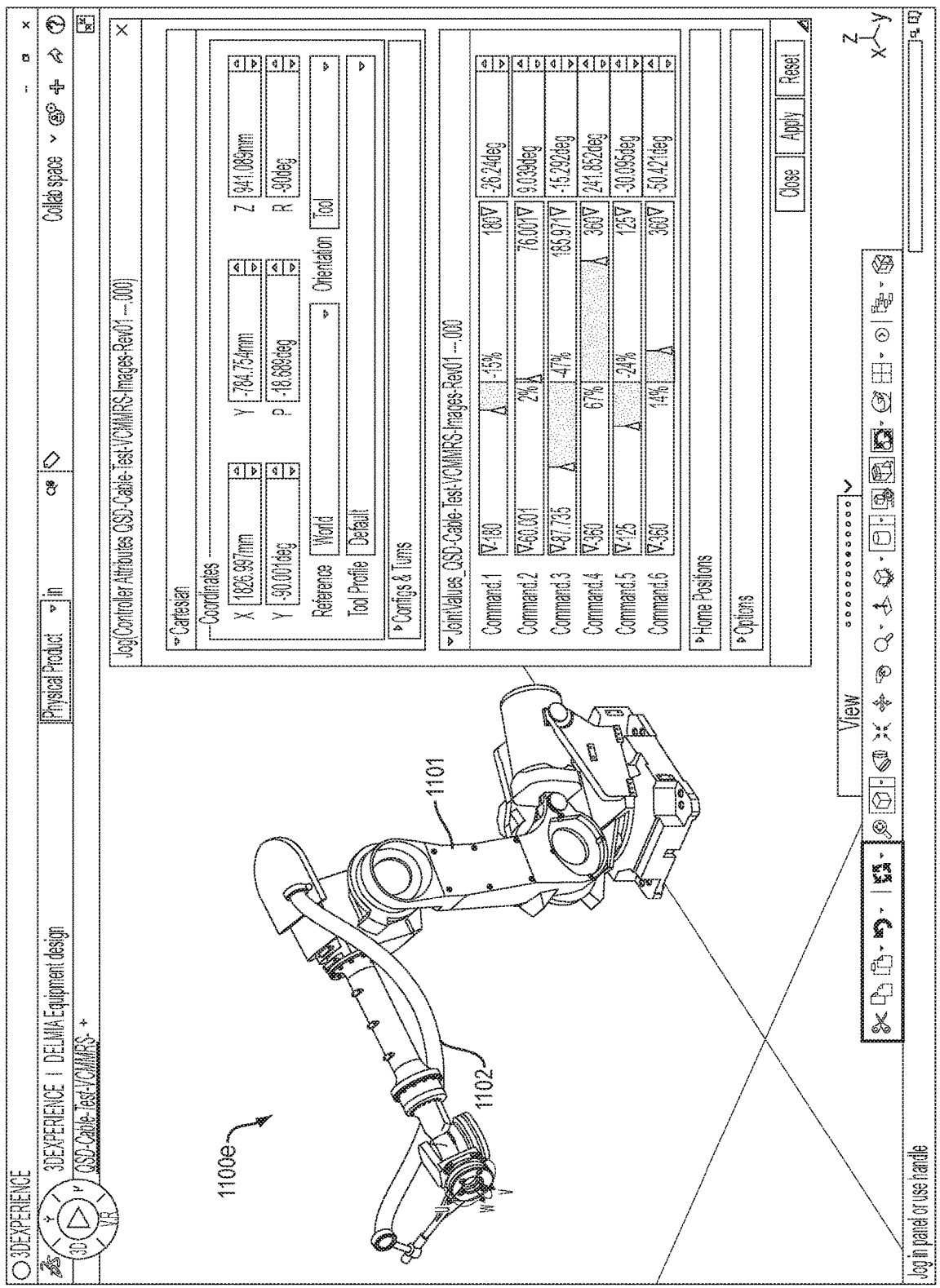
Figure 11F:
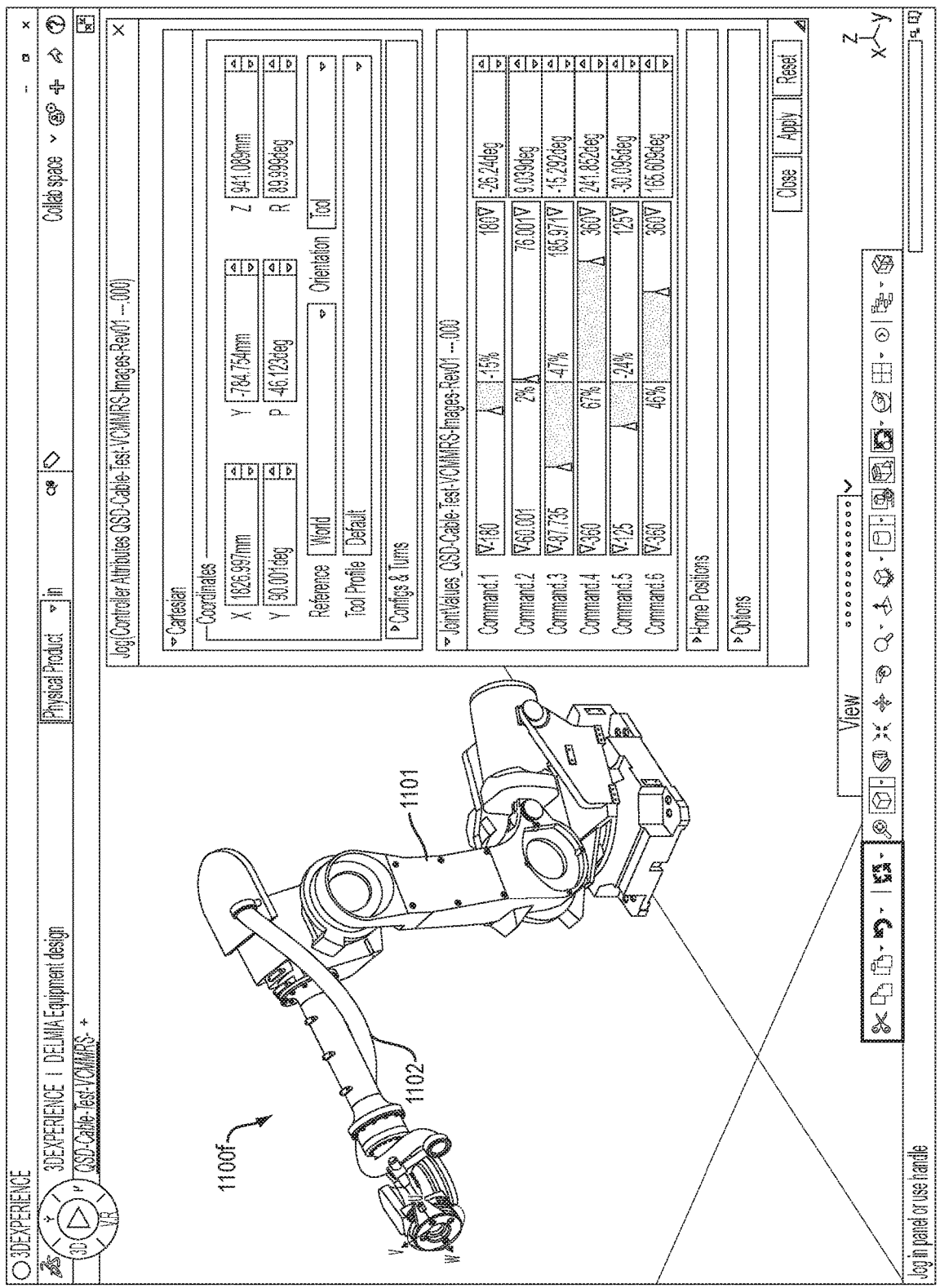
Figure 11G:
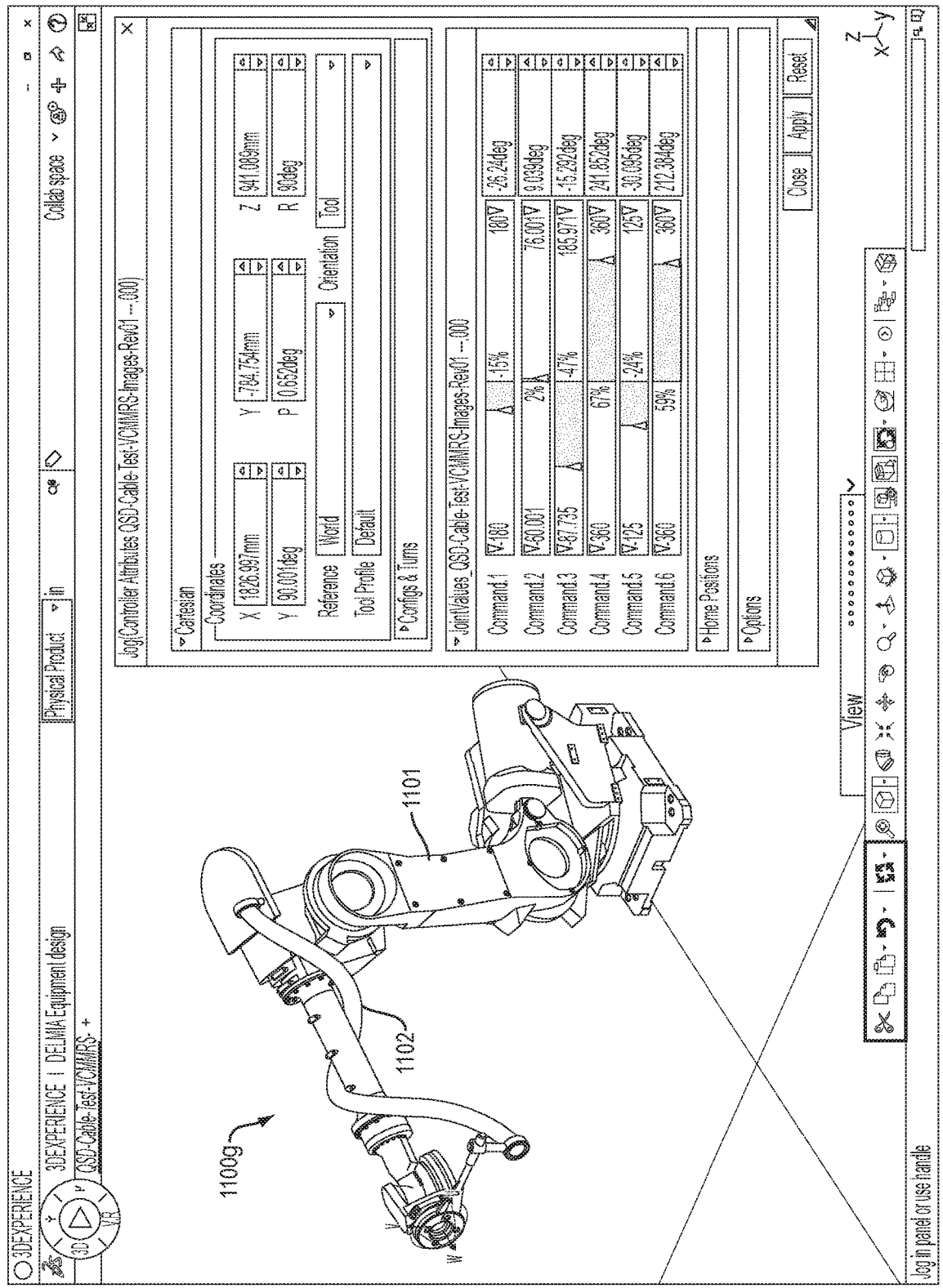

Embodiments realistically simulate the physics of a cable associated with a manufacturing resource while allowing for interactive simulation, i.e., changing the simulation conditions on the fly, in real-time. Embodiments accurately model stiffness, elasticity, gravity, and environment obstacle collisions for cables associated with manufacturing resources. FIGS. 11A-G illustrate various manufacturing resource configurations 1100a-g of a manufacturing resource 1101 and a cable 1102 that may be simulated using embodiments. The configuration 1100a in FIG. 11A depicts the manufacturing resource 1101 with the cable 1102 at a starting position. FIG. 11B illustrates a configuration 1100b where the robot 1101 with the cable 1102 has undergone a robot tool center point (TCP) translation from right to left horizontally. FIG. 11C illustrates a configuration 1100c where the robot 1101 with the cable 1102 has undergone a robot tool center point rotation of 45 degrees. FIG. 11D illustrates a configuration 1100d where the robot 1101 with the cable 1102 has undergone a robot tool center point rotation of 180 degrees. Likewise, FIG. 11E illustrates a configuration 1100e where the robot 1101 with the cable 1102 has undergone a robot tool center point rotation of 300 degrees and FIG. 11F illustrates a configuration 1100f where the robot 1101 with the cable 1102 has undergone a robot tool center point rotation of 400 degrees. Further, FIG. 11G illustrates a configuration 1100g where the robot 1101 with the cable 1102 has undergone a robot tool center point rotation of 450 degrees. FIGS. 11A-G illustrate a series of movements that may be simulated using embodiments. For instance, each configuration 1100a-g represents the robot 1101 during a time step and embodiments can determine the position of the cable 1102 at the end of each time step depicted in FIGS. 11A-G. FIGS. 11A-G illustrate an example embodiment demonstrating the desired cable behaviors including gravity, elasticity, stiffness, and obstacle collision penetration avoidance.

Embodiments provide high performance dynamic simulations of a resource with a cable by implementing a polyline that has virtualized inertia, stiffness, damping, and collision avoidance behaviors to model the cable. The method and system simulation embodiments of the present invention provide improved computational efficiency and results that enable real-world adjustments to the manufacturing resource and environment.

Embodiments of the present invention provide a new approach to virtualize the flexible cable simulation for manufacturing resource applications. In such applications the cable is typically a flexible tubular hose containing a bundle of electric and pneumatic cables that carry power and control signals to the manufacturing resource end effector, such as a spot weld gun attached to a moving robot. Embodiments model and simulate the flexible cable as a polyline of point masses with non-zero collision dimensions for obstacle contact and penetration avoidance. Such a polyline approach provides substantial computational performance improvements for simulating dynamic behavior of flexible cable bundles used with manufacturing resources and enables interactive simulation that is desired for this type of manufacturing simulation. Specifically, embodiments allow functionality where a simulation engineer can make real time modifications to the robot targets and robot motion programs so as to fine tune the manufacturing process plan in the simulation software. Such a polyline model would normally be inadequate since existing polylines do not include any consideration of cable stiffness based shape nor tension and obstacle collision behaviors which are necessary for a useful predictive manufacturing simulation. However, embodiments provide an innovative approach that solves this problem by including a new conceptual virtual shaping stiffness which along with cable elasticity and non-zero collision dimensions of the point masses along the polyline are highly effective and efficient in providing realistic behavior. With this innovative approach, the physics of cable stiffness is simulated by means of duplicating the expected torsional moment on each point of the polyline model by generating instead a pair of torsion equivalent forces at each point of the polyline. This allows embodiments to predict cable shape for manufacturing applications while providing interactive simulation performance.

An example embodiment creates a 3D polyline model of the cable and assigns a virtual point mass at each point of the polyline. In turn, a zero mass sphere with a dimension corresponding to a user input cable diameter is associated with each point. To continue, virtual gravitational force on each point mass, virtual elastic forces on each point mass, virtual torsion equivalent force pairs on each point mass, possible collision forces between the zero mass sphere and obstacles are all computed. These computed forces are processed to determine the acceleration of the point mass for the time step and the acceleration is integrated twice for the time step of the simulation so that the accelerations produced by the system of forces at each point mass are used to determine a new 3D position location for each point mass. These new locations result in a new virtual cable shape at the end of the simulation time step.

Figure 12:
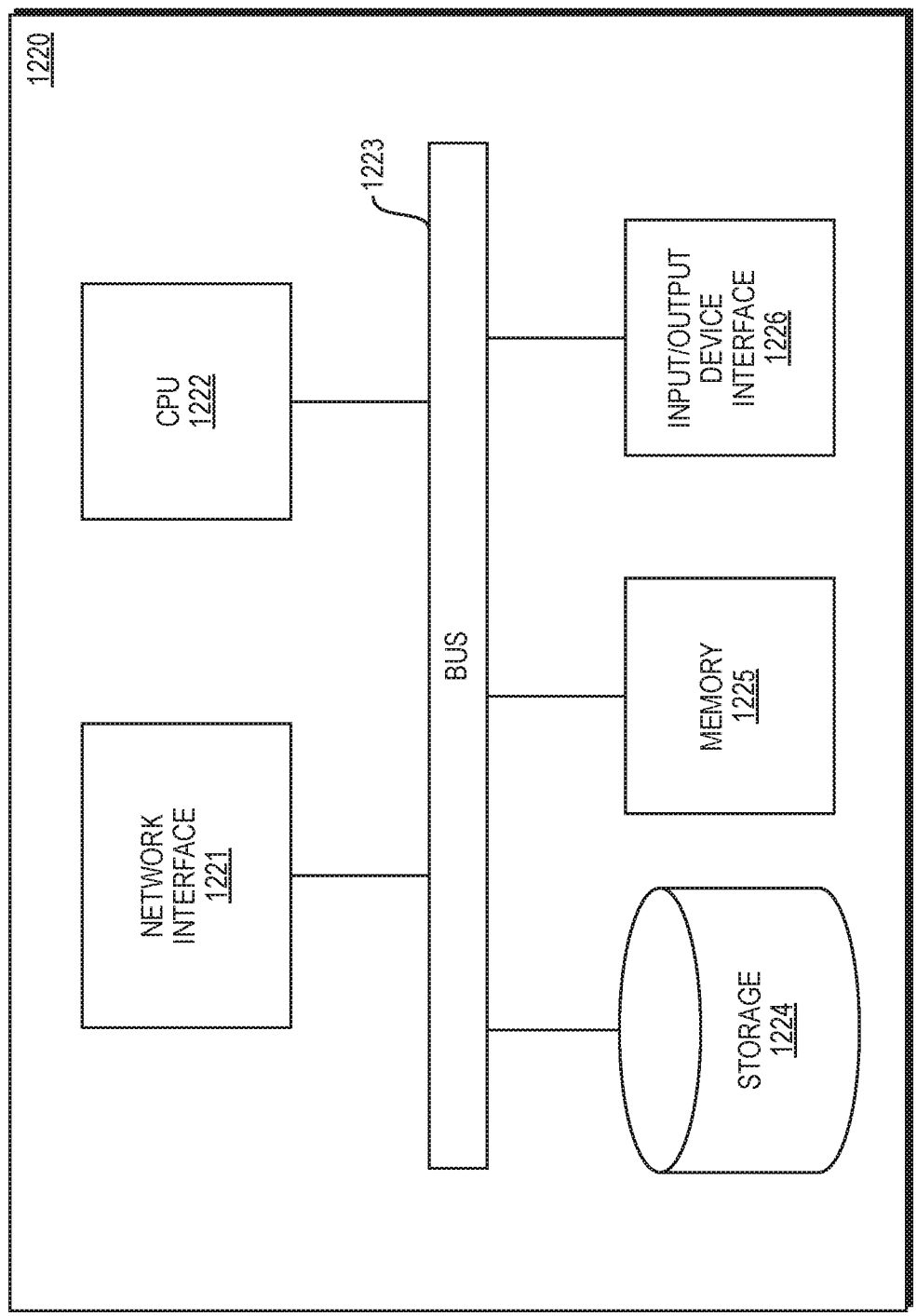
FIG. 12 is a simplified block diagram of a computer system for simulating a manufacturing resource according to an embodiment.

FIG. 12 is a simplified block diagram of a computer-based system 1220 that may be used to simulate a manufacturing resource including a cable according to any variety of the embodiments of the present invention described herein. The system 1220 comprises a bus 1223. The bus 1223 serves as an interconnect between the various components of the system 1220. Connected to the bus 1223 is an input/output device interface 1226 for connecting various input and output devices such as a keyboard, mouse, touch screen, display, speakers, etc. to the system 1220. A central processing unit (CPU) 1222 is connected to the bus 1223 and provides for the execution of computer instructions. Memory 1225 provides volatile storage for data used for carrying out computer instructions. Storage 1224 provides non-volatile storage for software instructions, such as an operating system (not shown). The system 1220 also comprises a network interface 1221 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 1220, or a computer network environment such as the computer environment 1330, described herein below in relation to FIG. 13. The computer system 1220 may be transformed into the machines that execute the methods described herein, for example, by loading software instructions implementing method 100 into either memory 1225 or non-volatile storage 1224 for execution by the CPU 1222. One of ordinary skill in the art should further understand that the system 1220 and its various components may be configured to carry out any embodiments or combination of embodiments of the present invention described herein. Further, the system 1220 may implement the various embodiments described herein utilizing any combination of hardware, software, and firmware modules operatively coupled, internally, or externally, to the system 1220.

Figure 13:
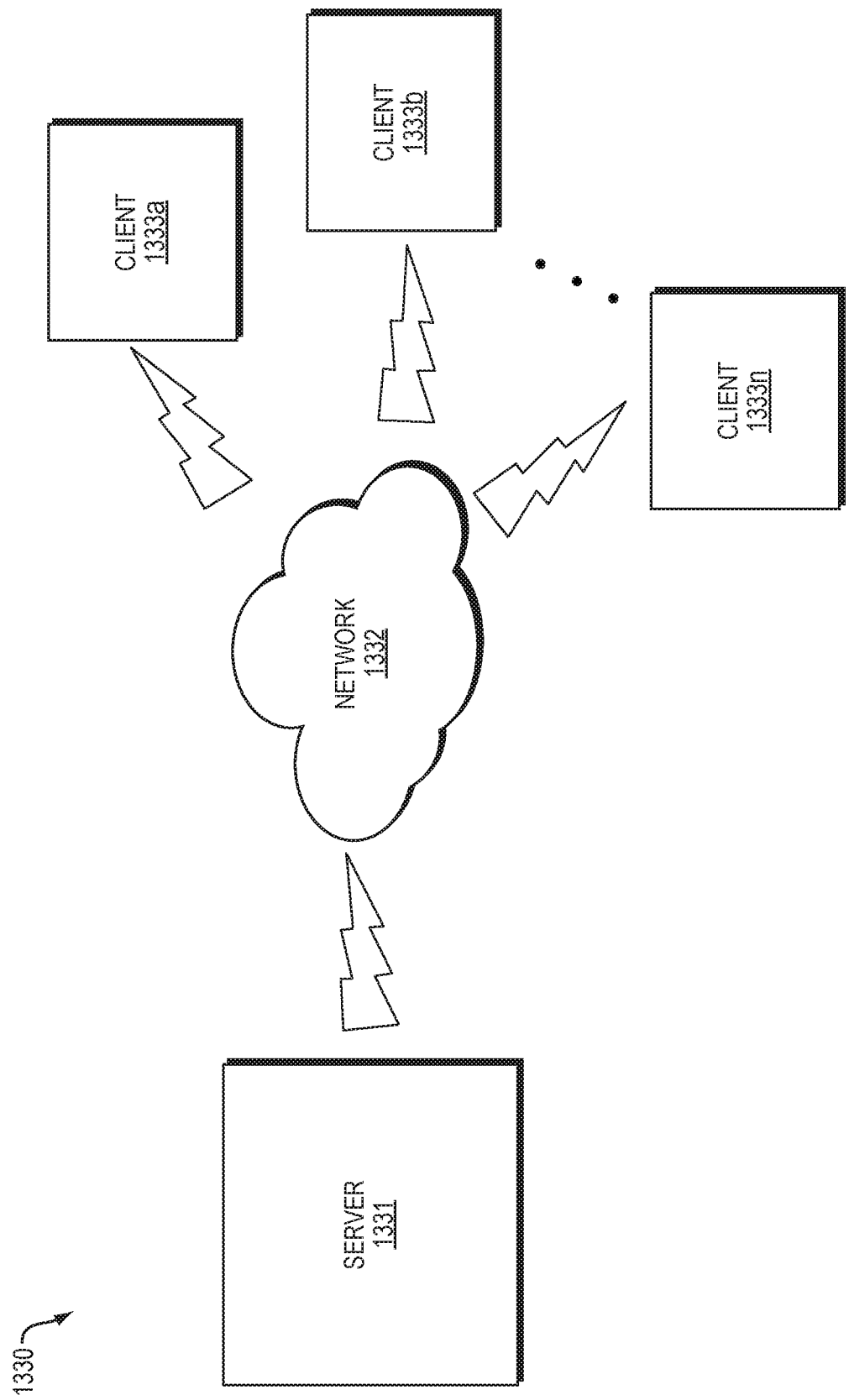
FIG. 13 is a simplified block diagram of a computer network environment in which embodiments of the present invention may be implemented.

FIG. 13 illustrates a computer network environment 1330 in which an embodiment of the present invention may be implemented. In the computer network environment 1330, the server 1331 is linked through the communications network 1332 to the clients 1333a-n. The environment 1330 may be used to allow the clients 1333a-n, alone or in combination with the server 1331, to execute any of the embodiments described herein. For non-limiting example, computer network environment 1330 provides cloud computing embodiments, software as a service (SAAS) embodiments, and the like.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for simulating a manufacturing resource including a cable, the method comprising:
   creating in computer memory a polyline model of a cable, the created model comprising a collection of points representing the cable;
   for each point of the collection of points:
      associating a point mass to the point;
      associating a zero mass sphere to the point, geometry of the zero mass sphere corresponding to a dimension of the cable at a location represented by the zero mass sphere; and
      assigning an elasticity and torsional stiffness between the point and adjacent points;

defining position and orientation of a start point and an end point of the collection of points representing the cable based upon position in three dimensional space of a manufacturing resource at an end of a time step; and performing a simulation of the cable for the time step by:
computing forces on each point of the collection of points using: (i) the associated point mass, (ii) the associated zero mass sphere, (iii) the assigned elasticity and torsional stiffness between the point and adjacent points, and (iv) the defined position and orientation of the start point and the end point of the collection of points; and
determining position in three dimensional space of each point of the collection of points representing the cable at the end of the time step based on the computed forces.

2. The method of claim 1 further comprising:
receiving user input indicating at least one of: cable length, cable end points, a number of points to represent the cable, cable density, stiffness of the cable, initial shape of the cable, and cable diameter.

3. The method claim 2 wherein the polyline model of the cable is created based upon the received user input.

4. The method of claim 2 wherein the point mass associated with each point is based upon the received user input indicating cable density.

5. The method of claim 2 wherein the zero mass sphere associated with each point is based upon the received user input indicating cable diameter.

6. The method of claim 1 wherein the computed forces include at least one of: gravitational force on each point, elastic force on each point, torsion equivalent force pairs on each point, and collision force between each zero mass sphere at each point and an obstacle.

7. The method of claim 1 wherein, determining position in three dimensional space of each point of the collection of points representing the cable at an end of the time step based on the computed forces comprises:
integrating accelerations and velocities due to a combination of the computed forces on each point to determine the position in three dimensional space of each point at the end of the time step.

8. The method of claim 1 further comprising determining the position in three dimensional space of the manufacturing resource at the end of the time step by:
simulating the manufacturing resource using at least one of: a model of the manufacturing resource, kinematics of the manufacturing resource, motion planning for the manufacturing resource, and motion of one or more obstacles in an operating environment of the manufacturing resource.

9. The method of claim 8 wherein the model of the manufacturing resource represents the manufacturing resource and a workcell environment in which the manufacturing resource operates.

10. The method of claim 1 further comprising:
associating an external gravitational acceleration with each point mass of the collection of points.

11. The method of claim 1 further comprising:
simulating the cable for a next time step.

12. The method of claim 11 wherein simulating the cable for the next time step includes:
updating the polyline model; and
performing the simulation of the cable for the next time step by:
computing the forces on each point of the collection of points for the next time step using: (a) the associated point mass, (b) the associated zero mass sphere, (c) the assigned elasticity and torsional stiffness between the point and adjacent points, and (d) the updated polyline model; and
determining position in three dimensional space of each point of the collection of points representing the cable at an end of the next time step based on the forces computed using the updated polyline model.

13. The method of claim 12 wherein updating the polyline model includes at least one of:
updating position of each point based on the determined position in three dimensional space of each point of the collection of points at the end of the time step;
updating position and orientation of the start point and the end point of the collection of points representing the cable based upon position in three dimensional space of the manufacturing resource at the end of the next time step.

14. The method of claim 13 further comprising determining the position in three dimensional space of the manufacturing resource at the end of the next time step by:
simulating the manufacturing resource using at least one of: the model of the manufacturing resource, kinematics of the manufacturing resource, motion planning for the manufacturing resource, and motions of one or more obstacles in an operating environment of the manufacturing resource.

15. A system for simulating a manufacturing resource including a cable, the system comprising:
a processor; and
a memory with computer code instructions stored thereon, the processor and the memory, with the computer code instructions, being configured to cause the system to:
create in computer memory a polyline model of a cable, the created model comprising a collection of points representing the cable;
for each point of the collection of points:
associate a point mass to the point;
associate a zero mass sphere to the point, geometry of the zero mass sphere corresponding to a dimension of the cable at a location represented by the zero mass sphere; and
assign an elasticity and torsional stiffness between the point and adjacent points;
define position and orientation of a start point and an end point of the collection of points representing the cable based upon position in three dimensional space of a manufacturing resource at an end of a time step; and
perform a simulation of the cable for the time step by:
computing forces on each point of the collection of points using: (i) the associated point mass, (ii) the associated zero mass sphere, (iii) the assigned elasticity and torsional stiffness between the point and adjacent points, and (iv) the defined position and orientation of the start point and the end point of the collection of points; and
determining position in three dimensional space of each point of the collection of points representing the cable at the end of the time step based on the computed forces.

16. The system of claim 15 wherein the processor and the memory with the computer code instructions, are further configured to cause the system to:
receive user input indicating at least one of: cable length, cable end points, a number of points to represent the cable, cable density, stiffness of the cable, initial shape of the cable, and cable diameter.

17. The system of claim 16 wherein to create the polyline model of the cable, the processor and the memory, with the computer code instructions, are further configured to cause the system to:
create the polyline model of the cable based upon the received user input.

18. The system of claim 15 wherein the computed forces include at least one of: gravitational force on each point, elastic force on each point, torsion equivalent force pairs on each point, and collision force between each zero mass sphere at each point and an obstacle.

19. The system of claim 15 wherein to determine position in three dimensional space of each point of the collection of points representing the cable at an end of the time step based on the computed forces, the processor and the memory, with the computer code instructions, are further configured to cause the system to:
integrate accelerations and velocities due to a combination of the computed forces on each point to determine the position in three dimensional space of each point at the end of the time step.

20. The system of claim 15 wherein the processor and the memory with the computer code instructions, are further configured to cause the system to determine the position in three dimensional space of the manufacturing resource at the end of the time step by:
simulating the manufacturing resource using at least one of: a model of the manufacturing resource, kinematics of the manufacturing resource, motion planning for the manufacturing resource, and motion of one or more obstacles in an operating environment of the manufacturing resource.

21. A non-transitory computer program product for simulating a manufacturing resource including a cable, the computer program product executed by a server in communication across a network with one or more client and comprising:
a computer readable medium, the computer readable medium comprising program instructions, which, when executed by a processor, causes the processor to:
create in computer memory a polyline model of a cable, the created model comprising a collection of points representing the cable;
for each point of the collection of points:
associate a point mass to the point;
associate a zero mass sphere to the point, geometry of the zero mass sphere corresponding to a dimension of the cable at a location represented by the zero mass sphere; and
assign an elasticity and torsional stiffness between the point and adjacent points;
define position and orientation of a start point and an end point of the collection of points representing the cable based upon position in three dimensional space of a manufacturing resource at an end of a time step; and
perform a simulation of the cable for the time step by:
computing forces on each point of the collection of points using: (i) the associated point mass, (ii) the associated zero mass sphere, (iii) the assigned elasticity and torsional stiffness between the point and adjacent points, and (iv) the defined position and orientation of the start point and the end point of the collection of points; and
determining position in three dimensional space of each point of the collection of points representing the cable at the end of the time step based on the computed forces.

* * * * *